United States Patent [19]

Sacripante et al.

[11] Patent Number: 6,063,827
[45] Date of Patent: May 16, 2000

[54] POLYESTER PROCESS

[75] Inventors: Guerino G. Sacripante, Oakville; Daniel A. Foucher, Toronto, both of Canada; J. Stephen Kittelberger, Rochester; Dongming Li, Fairport, both of N.Y.; Marko D. Saban, Etobicoke; Alan E. J. Toth, Burlington, both of Canada; Robert D. Bayley, Fairport, N.Y.

[73] Assignee: Xerox Corporation, Stamford, Conn.

[21] Appl. No.: 09/120,649

[22] Filed: Jul. 22, 1998

[51] Int. Cl.$^7$ .............. C08F 2/46; C08G 63/00; C08J 5/09

[52] U.S. Cl. .............. 522/6; 528/190; 528/193; 528/194; 528/195; 528/219; 528/275; 528/298; 528/302; 528/303; 528/306; 528/307; 528/308; 528/308.6; 524/777; 524/779; 524/788; 430/107; 430/114; 522/104; 522/165

[58] Field of Search .............. 528/190, 193, 528/194, 195, 219, 275, 298, 302, 303, 306, 307, 308, 308.6; 524/777, 779, 788; 430/107, 114; 522/6, 104, 165

[56] References Cited

U.S. PATENT DOCUMENTS

| | | |
|---|---|---|
| 3,590,000 | 6/1971 | Palermiti et al. .............. 252/62.1 |
| 3,800,588 | 4/1974 | Larson et al. .............. 73/71.6 |
| 4,131,731 | 12/1978 | Lai et al. .............. 528/370 |
| 4,533,614 | 8/1985 | Fukumoto et al. .............. 430/99 |
| 4,727,011 | 2/1988 | Mahabadi et al. .............. 430/138 |
| 4,788,122 | 11/1988 | Kawabe et al. .............. 430/109 |
| 4,988,794 | 1/1991 | Kubo et al. .............. 528/272 |
| 5,227,460 | 7/1993 | Mahabadi et al. .............. 528/272 |
| 5,332,860 | 7/1994 | Moore et al. .............. 560/91 |
| 5,366,841 | 11/1994 | Patel et al. .............. 430/137 |
| 5,373,030 | 12/1994 | Kaplan et al. .............. 521/173 |
| 5,376,494 | 12/1994 | Mahabadi et al. .............. 430/137 |
| 5,407,772 | 4/1995 | Bayley et al. .............. 430/109 |
| 5,449,719 | 9/1995 | Sacripante et al. .............. 525/445 |
| 5,466,554 | 11/1995 | Sacripante et al. .............. 430/110 |
| 5,714,568 | 2/1998 | Nava .............. 528/196 |

FOREIGN PATENT DOCUMENTS

10077336 A2   9/1996   Japan .

*Primary Examiner*—Samuel A. Acquah
*Attorney, Agent, or Firm*—E. O. Palazzo

[57] ABSTRACT

A process for the preparation of an unsaturated polyester which comprises (i) reacting an organic diol with a cyclic akylene carbonate in the presence of a first catalyst to thereby form a polyalkoxy diol, and (ii) optionally adding thereto a further amount of cyclic alkylene carbonate in the presence of a second catalyst, and (iii) subsequently polycondensing the resulting mixture with a dicarboxylic acid.

52 Claims, No Drawings

POLYESTER PROCESS

BACKGROUND OF THE INVENTION

The present invention is generally directed to a process for the preparation of polyester polymers, and which polyesters can be selected for the preparation polyester polymers which are preferably subsequently crosslinked for utilization as toner resins. In embodiments, the process of the present invention comprises a monomer addition procedure of, for example, first alkoxylating a dihydroxy containing monomer, such as a dihydroxy alkane or dihydroxy arylene, with a cyclic akylene carbonate in the presence of a catalyst such as an alkali carbonate, optionally followed by the addition of a further amount of cyclic alkylene carbonate in the presence of a second catalyst such as an alkali alkoxide, and followed by a subsequent addition of a diacid, such as a saturated or unsaturated aliphatic diacid or aromatic diacid, to enable the formation of a saturated or unsaturated polyester resin.

PRIOR ART

Polyester resins are generally prepared by a polycondensation process involving the reaction of a diol monomer and a diacid or diester monomer and producing water or an alcohol as byproduct, which is collected by distillation. Unsaturated polyester resins can be similarly prepared by the this process, with the primary exception that the diacid monomer is unsaturated, that is, it is comprised of a alkene segment such as fumaric or maleic acid or diesters thereof. Electrophotographic toners are generally comprised of a resin, such as a polyester, a pigment and optionally a charge control agent. Many various toner formulations are known, and more specifically, one preferred toner formulation is comprised of a crosslinked unsaturated polyester resin, such that desirable low fixing temperatures and offset properties are attained, reference, for example, U.S. Pat. No. 5,227,460, the disclosure of which is totally incorporated herein by reference, wherein there is disclosed as one preferred unsaturated polyester resin a poly(propoxylated bisphenol co-fumarate) which is crosslinked to a gel content of up to about 40 weight percent utilizing a peroxide to provide a toner useful for electrophotographic processes.

Unsaturated polyester resins derived from propoxylated bisphenol A with fumaric acid are known. More specifically, the propoxylated bisphenol A utilized is comprised for example, of a mixture of monomers prepared by the anionic propoxylation of bisphenol A with propylene oxide, in the presence of an alkali hydroxide catalyst in a pressurized vessel, and wherein the mixtures obtained are the alkali salts of 4-(2-hydroxyethyl)-bisphenol A, bis 4,4'-(2-hydroxyethyl)-bisphenol A, and 4-(2'-hydroxyethyl-2-oxyethyl)-4'-(2-hydroxyethyl)-bisphenol A. There exists, an alternative condensation method of alkoxylation that can be accomplished by the reaction of a diol with a cyclic alkylene carbonate, and specifically wherein bisphenol A can be condensed with a cyclic propylene carbonate in the presence of a catalyst and release carbon dioxide as the byproduct at elevated temperatures, thus producing a mixture of propoxylated bisphenol A. This latter condensation method has numerous economic advantageous in terms of monomer costs, and simplicity.

In U.S. Pat. No. 5,449,719, the disclosure of which, is totally incorporated herein by reference, there is illustrated a two-step process for the preparation of unsaturated polyester resin, and which comprises the first reaction of a phthalate and a glycol to provide a transesterified product, and subsequently a second reaction comprising reacting the product with an unsaturated dicarboxylate monomer. This differs from the present invention in that for example, the first reaction comprises the condensation of a diol with an alkylene carbonate and generates carbon dioxide as the byproduct.

In U.S. Pat. No. 5,407,772, the disclosure of which is totally incorporated herein by reference, there is illustrated an unsaturated linear polyester having repeating units of a reaction product of a first monomer, a second monomer, a third monomer and optionally a fourth monomer. The linear polymers have a glass transition temperature ranging from about 52° C. to about 61° C., and the first monomer should have a weight average molecular weight less than 200, the second monomer may be a dicarboxylic acid or diester which is different than the third monomer. The concentration of second residues of the polymer, derived from the second monomer, ranges from about 3 weight percent to about 15 weight percent, based on the total weight of the polymer. The third monomer is an aromatic dicarboxylic acid or an ester thereof. The fourth monomer is a diol having a higher molecular weight than the first monomer. In a process for preparing the inventive polymer of '772, the first, the second, the third monomer (and optionally a fourth) and/or a catalyst undergo trans-esterification to form the unsaturated, linear polyester.

In U.S. Pat. No. 4,788,122, there is disclosed the production of a toner polyester resin obtained by co-polycondensation of (a) a diol component of polyalkylene-bis(4-hydroxy-phenyl)propane and (b) an acid component, improved by incorporating into the acid component a copolymer of styrene or derivative thereof and a carboxylic vinyl monomer.

In U.S. Pat. No. 5,466,554, there is disclosed a toner composition with modified polyester resin free of acid end groups, and obtained from the condensation of a first diol monomer, a second diacid monomer and third monovalent alcohol or acid monomer. Similarly, in U.S. Pat. No. 5,686,218, there disclosed a process which comprises reacting a polyester resin end capped with hydroxyl moieties or groups with an organic acid anhydride at a temperature from about 125° C. to about 200° C., thereby resulting in a polyester resin end-capped with acid moieties or acid groups. Other polyester based toners and process thereof are illustrated in U.S. Pat. Nos. 4,988,794; 4,727,011; 4,533,614 and 5,366,841.

In U.S. Pat. No. 2,766,292, there is disclosed a process for preparing oxyalkyating derivatives such as anhydrous, substantially undiluted oxyalkylated derivatives from an anhydrous solid, oxyalkylation-susceptible pentaerythritol compound, which satisfies one of the following two conditions (a) it is infusible; (b) it suffers at least partial decomposition if maintained at its beginning of-fusion temperature for a period of at least 15 minutes in the presence of an oxyalkylation catalyst, and which solid is insoluble in oxyalkylation-resistant, distillation separable solvent; which process consists of reacting the solid with at least one alkylene carbonate selected from ethylene carbonate, propylene carbonate, and butylene carbonate, in the presence of an oxyalkylation catalyst at a temperature producing carbon dioxide.

In U.S. Pat. No. 4,131,731, there is disclosed a process for preparing linear polycarbonates containing terminal hydroxyl groups with the essential exclusion of other terminal groups by reacting glycols having a carbon number >4 and cyclic esters of carbonic acid via ester interchange reaction 100° C. to 300° C., and 300 millimeters Hg.

In U.S. Pat. No. 5,373,030, there is disclosed a process for the preparation of polyurethane foams and similarly, in U.S. Pat. No. 5,332,860 there is illustrated the use of polyols for preparing polyurethane foams having improved retention of insulative properties.

In U.S. Pat. No. 5,714,568, there is disclosed a process comprising the reaction of a polyfunctional organic acid or anhydride and a cyclic organic carbonate compound in the presence of a catalyst selected from the group consisting of an alkali metal, thereby generating a polyester or copolyester resin.

Japanese Patent Publication JP 10077336 A2 discloses a process for the preparation of copolyesters by the reaction of an aromatic diol with an alkylene carbonate in the presence of an alkali carbonate catalyst to form a diol, at a conversion of, for example, more than about 75 percent as measured by the evolution of carbon dioxide byproduct, followed by the subsequent addition of yet another diol and a diacid and continuing the polymerization at high pressure and temperature of about 240° C. to yield the aforesaid copolyester resin. The isomeric mixtures in the present invention comprised, for example, of isomers I, II and III are not believed to be disclosed in the JP '336 documents particularly in the isomer ratios of from about 0 to about 5 weight percent of isomer I, of from about 89 to about 97 weight percent of isomer II, and from about 0 to about 15 weight percent of isomer III, by the utilization of a mixture of both an alkali carbonate and an alcohol. The process of the present invention differs, for example, in that the specific mixtures amounts of the three isomers are controlled and obtained by the use of specific catalyst in a multistep process to form polyester resins that can be selected for use as toner binders. Furthermore, the unsaturated polyester, poly(propoxylated bisphenol A—co-fumarate) is not apparently disclosed in the above JP '336 document. The unsaturated polyesters of the present invention are of importance for crosslinking to a high gel content of for example, from about 5 to about 50 percent gel. Additionally, in the process of the present invention, high pressures are not necessarily utilized in forming the polyester resins, and in embodiments the highest temperature selected to generate the polyester resin is from about 200° C. to about 215° C. Furthermore, the aforementioned '336 Patent utilizes both a diol and diacid during the polymerization steps to form a copolyester. This differs from the present invention wherein in embodiments a diacid is utilized to form the polyester during the polycondensation step.

Japanese Patent publication JP 10095840 A2 discloses a process for the preparation of copolyesters by the reaction of an aromatic diol with an alkylene carbonate in the presence of an alkali carbonate catalyst to form a diol, at a conversion of for example, more than about 75 percent as measured by the evolution of carbon dioxide byproduct, followed by the subsequent addition of yet another diol and a mixture of diacid and continuing the polymerization at high pressure and temperature of about 240° C. to yield the aforesaid copolyester resin. The isomeric mixtures in the present invention are comprised of isomers I, II and III which do not appear to be recognized or disclosed in the JP '840 documents, particularly in a three step monomer processes to produce the isomer ratios of from about 0 to about 1 weight percent of isomer I, of from about 89 to about 97 weight percent of isomer II, and from about 3 to about 15 weight percent of isomer III, by the utilization of a mixture of both an alkali carbonate and alcohol derived alkali. Furthermore, the aforementioned '840 patent utilizes both a diol and diacid during the polymerization steps to form a copolyester. This differs from the present invention wherein in embodiments only a diacid need be utilized to form the polyester during the polycondensation step.

Japanese Patent Publication JP 10087802 A2 discloses a process for the preparation of polyesters obtained by polymerizing an aromatic dicarboxylic acid and aliphatic glycol to form a carboxylic group-terminated polyester oligomer with esterification degree of about 80 percent conversion, and melt reacting with an aromatic diol and cyclic 5 or 6 member alkylene carbonate in the presence of a catalyst such as lithium dictate.

SUMMARY OF THE INVENTION

It is a feature of the present invention to provide economical process for the preparation of polyester resins.

It is another feature of this invention is to provide multistep "one pot" economical process for the preparation of polyester resins, such as an unsaturated polyester resin, and wherein the first step is comprised of the alkoxylation of a diol, such as bisphenol A with an alkylene carbonate in the presence of an alkali carbonate such as potassium carbonate, and followed optionally by a subsequent step of adding more alkylene carbonate in the presence of a second alkali alkoxide catalyst such as potassium methoxide, followed by the polycondensation step of adding thereto a diacid such as fumaric acid to produce the polyester resin upon further heating and reducing the pressure.

Moreover, it is a feature of this invention to provide a process for the preparation of an unsaturated polyester which comprises (i) reacting an organic diol with a cyclic akylene carbonate in the presence of a first catalyst to thereby form a bis- alkoxy diol, and (ii) optionally adding thereto a further amount of cyclic alkylene carbonate in the presence of a second catalyst, and (iii) subsequently polycondensing the resulting mixture with an unsaturated diacid.

Yet, it is another feature of this invention to provide a process for the preparation of an unsaturated polyester resin which is comprised of (i) reacting an organic diol with a cyclic akylene carbonate in the presence of a first catalyst to thereby form a bis-alkoxy diol, and wherein the bis-alkoxy diol is comprised of the isomers of Formula 1 or Formula 2 with from about 2 to about 5 weight percent of isomer I, from about 95 to about 99 weight percent of isomer II, and from about 0 to about 3 weight percent of isomer III, and wherein the sum of I, II, and III is about 100 percent, and wherein said isomers are of the formula as illustrated in Formula 1.

In a further feature of this invention, there are provided processes for the preparation of an unsaturated polyester resin which comprises (i) reacting an organic diol with a cyclic akylene carbonate in the presence of a first catalyst to thereby form a bis- alkoxy diol, and (ii) adding thereto a further amount of cyclic alkylene carbonate in the presence of a second catalyst, and wherein the bis-alkoxy diol is comprised of the isomers with from about 0 to about 1 weight percent of isomer I, from about 85 to about 97 weight percent of isomer II, and from about 3 to about 15 weight percent of isomer III, and the sum of I, II, and III is about 100 percent and wherein the isomers are of the formula as illustrated in 1.

It is also a feature of this invention to provide a crosslinked polyester generated by the reactive extrusion of a peroxide and an unsaturated polyester.

Moreover, in yet another feature of this present invention, there is provided an unsaturated polyester resin, poly (propoxylate bisphenol A—co-fumarate), which can be crosslinked up to about 50 percent gel content with a peroxide such as benzoyl or lauryl peroxide.

In a further feature of this present invention, there is provided a toner comprised of an unsaturated polyester resin prepared by a two or three step monomer addition process, a colorant and optionally a charge enhancing agent.

In yet a further feature there is provided a two step monomer addition process for the preparation of an unsaturated resin with a glass transition temperature of from about 58° C. to about 62° C., and preferably from about 58° C. to about 60° C.

Moreover, in yet a further feature, there is provided a three step monomer addition process for the preparation of an unsaturated resin with a glass transition temperature of from about 52° C. to about 57.9° C.

Moreover, in another feature there is provided a process for the preparation of an unsaturated resin, wherein the first step generates a mixture of three isomers of propoxylated bisphenol A, by utilizing alkali carbonate catalysts.

These and other features of the present invention can be provided by first alkoxylating a dihydroxy containing monomer, such as a dihydroxy alkane or dihydroxy arylene, with an alkylene carbonate in the presence of a catalyst such a as an alkali carbonate or alkali alkoxide, to form an alkoxy diol, preferably in an amount of 100 percent, and preferably of the isomer formulas illustrated herein, optionally followed by the second subsequent addition of alkylene carbonate in the presence of a second alkali alkoxide catalyst, and followed thereafter with the polycondensation process by the addition of a diacid, such as a saturated or unsaturated aliphatic diacid or aromatic diacid, to enable the fabrication of a saturated or unsaturated polyester resin.

Aspects of the present invention relate to a process for the preparation of an unsaturated polyester which comprises (i) reacting an organic diol with a cyclic akylene carbonate in the presence of a first catalyst to thereby form a polyalkoxy diol, and (ii) optionally, but preferably adding thereto a further amount of cyclic alkylene carbonate in the presence of a second catalyst, and (iii) subsequently polycondensing the resulting mixture with a dicarboxylic acid; a process wherein the preparation of an unsaturated polyester comprises (i) reacting an organic diol in an effective amount of, for example, from about 0.95 to about 1.05 mole equivalents with a cyclic akylene carbonate in an effective amount of, for example, from about 1.95 to about 2.05 mole equivalents, in the presence of a first alkali carbonate catalyst in an effective amount of, for example, from about 0.001 to about 0.1 mole equivalents, to thereby form a polyalkoxy diol, and wherein the polyalkoxy diol is comprised of isomers with, for example, from about 2 to about 5 weight percent of isomer I, from about 95 to about 99 weight percent of isomer II, and from about 0 to about 3 weight percent of isomer III, and the sum of I, II, and III is about 100 percent and wherein said isomers are of the formula as illustrated in Formula 2

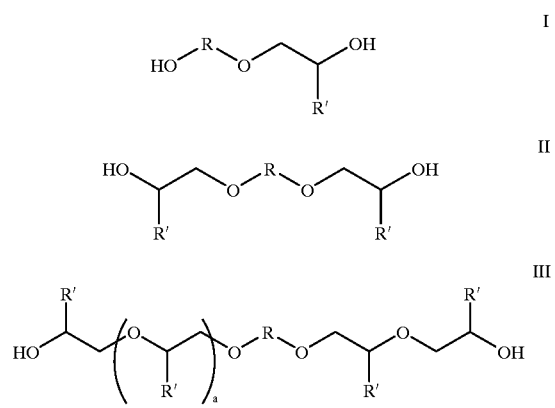

and followed by subsequently polycondensing the resulting polyalkoxy diol with a dicarboxylic acid in an amount of from about 0.95 to about 1.05 mole equivalents, wherein R is an aromatic component, R' is hydrogen or alkyl, and a is zero, 1, or 2, or a mixture of zero, 1, and 2; a process wherein the preparation of an unsaturated polyester comprises (i) reacting an organic diol in an amount of from about 0.95 to about 1.05 mole equivalents with a cyclic akylene carbonate in an amount of from about 1.95 to about 2.05 mole equivalents, in the presence of a first alkali carbonate catalyst in an amount of from about 0.001 to about 0.1 mole equivalents; adding thereto (ii) from about 0.05 to about 0.45 mole equivalents of cyclic alkylene carbonate in the presence of a second alkali alkoxide catalyst in an amount of from about 0.001 to about 0.1 mole equivalents, to thereby form a polyakoxy diol comprised of the isomers with from about 0 to about 1 weight percent of isomer I, from about 85 to about 97 weight percent of isomer II, and from about 3 to about 15 weight percent of isomer III, and the sum of I, II, and III is about 100 percent and wherein said isomers are of the formula as illustrated in Formula 1 that follows

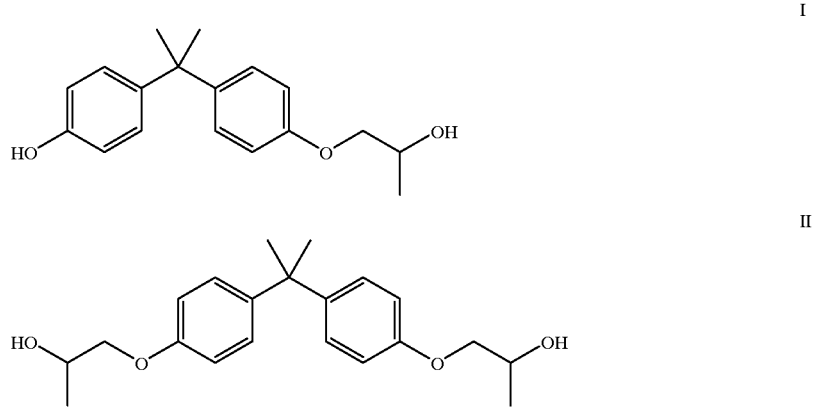

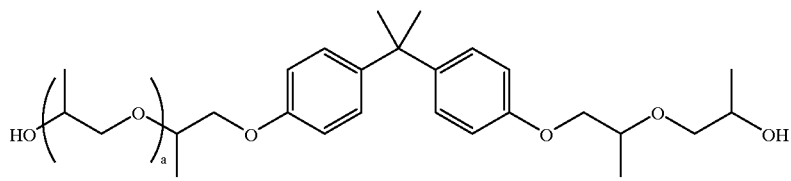

III wherein a is as illustrated herein, and followed by subsequently polycondensing the resulting polyalkoxy diol with a dicarboxylic acid in an amount of from about 0.95 to about 1.05 mole equivalents; a process wherein there is formed a crosslinked polyester generated by the reactive extrusion of a peroxide and an unsaturated polyester; a process wherein the first catalyst is an alkali carbonate; a process wherein the second catalyst is an alkali alkoxide; a process wherein said reacting is accomplished in the presence of heat; a process wherein said reacting is accomplished by heating at a temperature of from about 160° C. to about 215° C.; a process wherein said reacting is accomplished by heating at a temperature of from about 180° C. to about 200° C.; a process wherein said polycondensing is accomplished by heating; a process wherein said polycondensing is accomplished by heating at a temperature of from about 185° C. to about 225° C.; a process wherein said polycondensing is accomplished by heating at a temperature of from about 185° C. to about 225° C. for a duration of from about 1 to about 5 hours, followed by reducing the pressure from about 760 Torr to about 1 Torr over a period of from about 1 to about 6 hours; a process wherein subsequent to said polycondensing the reaction mixture is cooled; a process wherein said cooling is from about 25° C. to about 40° C.; a process wherein said cooling is to about 25° C.; a process wherein there is formed a crosslinked polyester generated by the reactive extrusion of a peroxide and an unsaturated polyester; a process wherein said crosslinking is represented by a gel content of from about 3 to about 75 percent; a process wherein said crosslinking is represented by a gel content of from about 3 to about 45 percent; a process wherein there is formed an unsaturated polyester resin of poly(propoxylated bisphenol co-fumarate), poly(ethoxylated bisphenol co-fumarate), poly(butyloxylated bisphenol co-fumarate), poly(co-propoxylated bisphenol co ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co ethoxylated bisphenol co-itaconate), or poly(1,2-propylene itaconate); a process wherein said diol is 1,2-propanediol, 1,3-propanediol, 1,3- butane diol, pentylene glycol, hexylene glycol, diphenol, neopentyl glycol, diethylene glycol, dipropylene glycol, 2,2-bis-(4-hydroxy phenyl) propane, 2,2-bis-(3-hydroxy phenyl) propane, 2,2-bis-(2-hydroxy phenyl) propane, 2,2-bis-(3-hydroxy phenyl) propane, 2,2-bis-(5-hydroxy phenyl) propane, bisphenol A, ethoxylated bisphenol A, bis-(4-hydroxy phenyl) methane, 1,1-bis-(4-hydroxy phenyl) ethane, cis-1,4-dihydroxy-cyclohexane, trans-1,4-dihydroxy-cyclohexane, cis-1,2-dihydroxy-cyclohexane, trans-1,2-dihydroxy-cyclohexane, trans-1,3-dihydroxy-cyclohexane, cis-1,3-dihydroxy-cyclohexane, and mixtures thereof and which diols are selected in an amount of from about 0.90 mole equivalents to about 1.1 mole equivalents, based on about 1 mole equivalent of dicarboxylic acid utilized; a process wherein said diol is 2,2-bis-(4-hydroxy phenyl) propane or bisphenol A; a process wherein the dicarboxylic acid is fumaric acid, malonic acid, itaconic acid, 2-methylitaconic acid, maleic acid, maleic anhydride, adipic acid, succinic acid, suberic acid, 2-ethyl succinic acid, glutaric acid, dodecylsuccinic acid, 2-methyladipic acid, pimelic acid, azeilic acid, sebacic acid, terephthalic acid, isophthalic acid, phthalic acid, 1,2-cyclohexanedioic acid, 1,3-cyclohexanedioic acid, 1,4-cyclohexanedioic acid, dialkyl esters wherein alkyl contains from about 2 to about 22 carbon atoms, and are esters of malonate, succinate, fumarate, itaconate, terephthalate, isophthalate, phthalate, cyclohexanedioate, mixtures thereof, and which diacids are optionally selected in an amount of from about 0.95 mole equivalent to about 1.1 mole equivalents, based on about 1 mole equivalent of organic diol utilized; a process wherein the dicarboxylic acid is fumaric acid; a process wherein the cyclic alkylene carbonate is ethylene carbonate, propylene carbonate, or butylene carbonate, or mixtures thereof, and which alkylene carbonate can be selected in an amount of from about 1.90 mole equivalents to about 2.45 mole equivalents, based on about 1 mole equivalent of organic diol utilized; a process wherein the first alkali catalyst is an alkali carbonate; a process wherein the alkali carbonate is potassium carbonate, sodium carbonate, rubedium carbonate, cesium carbonate, beryllium carbonate, magnesium carbonate, calcium carbonate, strontium carbonate, manganese carbonate, or barium carbonate and mixture thereof and which alkali carbonates are selected in an amount of from about 0.001 mole equivalent to about 0.01 mole, based on about 1 mole equivalent of organic diol utilized; a process wherein the alkali carbonate is potassium carbonate; a process wherein the second catalyst is an alkali alkoxide; a process wherein the alkyl alkoxide is lithium methoxide, lithium ethoxide, lithium propoxide, lithium butoxide, lithium isopropoxide, lithium isobutoxide, lithium t-butoxide, potassium methoxide potassium ethoxide, potassium propoxide, potassium butoxide, potassium isopropoxide, potassium isobutoxide, potassium t-butoxide, sodium methoxide, sodium ethoxide, sodium propoxide, sodium butoxide, sodium isopropoxide, sodium isobutoxide, or sodium t-butoxide, and mixtures thereof, and which alkyl alkoxide is selected in an amount of from about 0.001 mole equivalent to about 0.05 mole equivalent, based on about 1 mole equivalent of organic diol utilized; a process wherein the alkyl alkoxide is potassium t-butoxide; a processwherein said first catalyst is selected in an amount of from about 0.01 to about 0.1 mole percent by weight of the unsaturated polyester; a process wherein said second catalyst is selected in an amount of from about 0.01 to about 0.1 mole percent by weight of the unsaturated polyester; a process wherein the peroxide is an aliphatic peroxide, an aromatic peroxide, or mixtures thereof; a process wherein the peroxide is benzoyl peroxide, lauryl peroxide, t-butyl peroxide, propyl peroxide, or stearyl peroxide; a process wherein a polyester resin is formed by (i) reacting an organic diol in an amount of from about 0.95 to about 1.05 mole equivalents, with a cyclic akylene carbonate in an amount of from about 1.95 to about 2.05 mole equivalents, and a catalyst in an amount of from about 0.001 to about 0.1 mole equivalents at a temperature of from about 175° C. to about 205° C., for a duration of, for example, from about 1 to about 6 hours; and followed by polycondensing with a dicarboxylic acid in an amount of from about 0.95 to about 1.05 mole equivalents, for a duration of, for example, from about 1 to 3 hours, and followed by reducing the pressure from about 760 Torr to about 1 Torr over a period of from about 1 to about 6 hours; a process wherein a polyester resin is formed by (i) reacting an organic diol in an amount of from about 0.95 to about 1.05 mole equivalent, with a cyclic akylene carbonate in an amount of from about 1.95 to about 2.05 mole equivalents, and a catalyst in an amount of from about 0.001 to about 0.1 mole equivalent, at a temperature of from about 175° C. to about 205° C., for a duration of from about 1 to about 6 hours; (ii) adding thereto a cyclic akylene carbonate in an amount of from about 0.05 to about 0.35 mole equivalent, with a second alkali alkoxide catalyst in an amount of from about 0.001 to about 0.1 mole equivalent, at a temperature of from about 185° C. to about 205° C.; and (iii) followed by polycondensing with a dicarboxylic acid in an amount of from about 0.95 to about 1.05 mole equivalent, for a duration of from about 1 to about 3 hours, and followed by reducing the pressure from about 760 Torr to about 1 Torr over a period of from about 1 to about 6 hours; a process wherein the unsaturated polyester resin is obtained from (i) condensing about 0.95 to about 1.05 mole equivalent of an organic diol, with from about 1.95 to about 2.05 mole equivalent of an alkylene carbonate in the presence of a first alkali catalyst at a temperature of from about 175° C. to about 205° C., for a duration of from about 1 to about 6 hours; and (ii) optionally adding thereto a further amount of from about 0.05 to about 0.35 mole equivalent of a cyclic alkylene carbonate and a second catalyst a temperature of from about 185° C. to about 205° C., for a duration of from about 1 to about 3 hours; and (iii) polycondensing with a dicarboxylic acid in an amount of from about 0.95 to about 1.05 mole equivalent, for a duration of from about 1 to 3 hours, and followed by reducing the pressure from about 760 Torr to about 1 Torr over a period of from about 1 to about 6 hours; a process wherein said cyclic alkylene carbonate is employed in an amount of from about 1.9 equivalents to about 2.1 mole equivalents, based on about 1 mole equivalent of organic diol utilized; a process wherein there is further added a cyclic alkylene carbonate in an amount of from about 0.05 mole equivalent to about 0.30 mole equivalent, based on about 1 mole equivalent of organic diol utilized; a process wherein the unsaturated polyester resin is obtained from (i) condensing about 0.95 to about 1.05 mole equivalent of an organic diol, with from about 1.95 to about 2.05 mole equivalent of an alkylene carbonate in the presence of a first alkali catalyst at a temperature of from about 175° C. to about 205° C., for a duration of from about 1 to about 6 hours; and (ii) optionally adding thereto a further amount of from about 0.05 to about 0.35 mole equivalent of a cyclic alkylene carbonate and a second catalyst a temperature of from about 185° C. to about 205° C., for a duration of from about 1 to about 3 hours; and (iii) followed by a third step comprised of adding a dicarboxylic acid, heating the mixture of from about 185° C. to about 220° C., followed by reducing the pressure from about 760 Torr to about 1 Torr; a process wherein the polyester resulting is poly(propoxylated bisphenol co-fumarate), poly(ethoxylated bisphenol co-fumarate), poly(butyloxylated bisphenol co-fumarate), poly(co-propoxylated bisphenol co ethoxylated bisphenol co-fumarate), or poly(propoxylated bisphenol co-maleate); a process for the preparation of crosslinked polyesters obtained from the reactive extrusion of a peroxide and an unsaturated polyester resin, and which resin is generated by (i) reacting an organic diol with a cyclic akylene carbonate in the presence of a first catalyst to thereby form a polyalkoxy diol; (ii) optionally adding thereto a further amount of cyclic alkylene carbonate in the presence of a second catalyst; and (iii) subsequently polycondensing the resulting mixture with a dicarboxylic acid; a toner comprised of the polyester and colorant; a toner wherein the colorant is a dye, or a pigment; a toner wherein the toner contains a wax component; a toner wherein the toner contains a charge additive; a toner wherein the toner contains a wax component and a charge additive; a toner wherein the toner contains surface additives; a toner wherein said additives are comprised of silicas, metal oxides, fatty acid salts, or mixtures thereof; a developer comprised of the toner and carrier; a toner wherein the polyester is poly(propoxylated bisphenol co-fumarate); a process wherein the polyester is poly(propoxylated bisphenol), and the bis-alkoxy diol is propoxylated bisphenol A comprised of mixture of isomers of 4-(2-hydroxyethyl)-bisphenol A, bis 4,4'-(2-hydroxyethyl)-bisphenol A, 4-(2'-hydroxyethyl-2-oxyethyl)-4'-(2-hydroxyethyl)-bisphenol A and/or higher ordered propoxylated bisphenol A polyols, illustrated as monomers I, II and III, respectively, of Formula 2

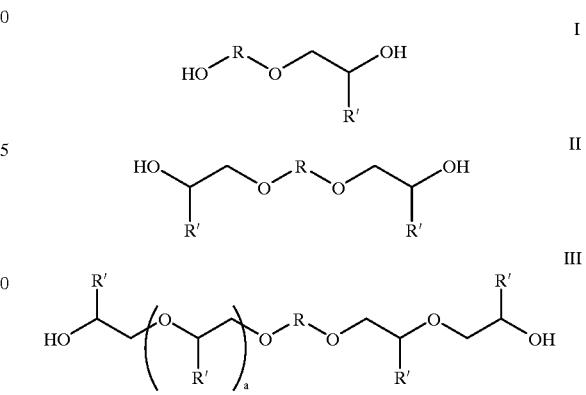

wherein R is an aromatic component, R' is hydrogen or alkyl, and a is zero, 1, or 2, or a mixture of zero, 1, and 2; a process wherein the polyester is poly(propoxylated bisphenol), and the bis-alkoxy diol is propoxylated bisphenol A comprised of mixture of isomers of 4-(2-hydroxyethyl)-bisphenol A, bis 4,4'-(2-hydroxyethyl)-bisphenol A, 4-(2'-hydroxyethyl-2-oxyethyl)-4'-(2-hydroxyethyl)-bisphenol A and/or higher ordered propoxylated bisphenol A polyols, illustrated as monomers I, II and III, respectively, of Formula 1

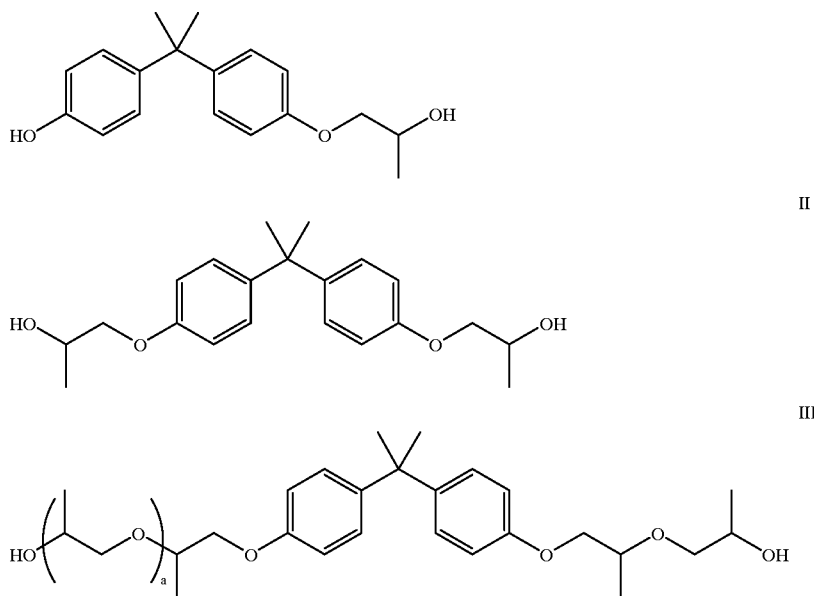

wherein a is as illustrated herein; a process wherein the isomers contain from about 2 to about 5 weight percent of isomer I, from about 90 to about 97 weight percent of isomer II, and from about 0 to about 3 weight percent of isomer III, and the sum of I, II, and III is about 100 percent; a process wherein the preparation of an unsaturated polyester comprised of (i) reacting bisphenol A or 2,2-bis(4-hydroxy phenyl) propane with a propylene carbonate in the presence of a first catalyst to thereby form a bis-alkoxy diol, and (ii) adding thereto a further amount of propylene carbonate in the presence of a second catalyst, and wherein the bis-alkoxy diol is comprised of the isomers of Formula 1 wherein a represents the number of segments and with from about 0 to about 1 weight percent of isomer I, from about 85 to about 97 weight percent of isomer II, and from about 3 to about 15 weight percent of isomer III, and the sum of I, II, and III is about 100 percent; a process wherein the aromatic R group is a radical moiety of the group selected from 2,2-bis-(4-hydroxy phenyl) propane, 2,2-bis-(3-hydroxy phenyl) propane, 2,2-bis-(2-hydroxy phenyl) propane, 2,2-bis-(3-hydroxy phenyl) propane, 2,2-bis-(5-hydroxy phenyl) propane, bisphenol A, ethoxylated bisphenol A, bis-(4-hydroxy phenyl) methane, 1,1-bis-(4-hydroxy phenyl) ethane and hydroquinone; a process wherein the aromatic R

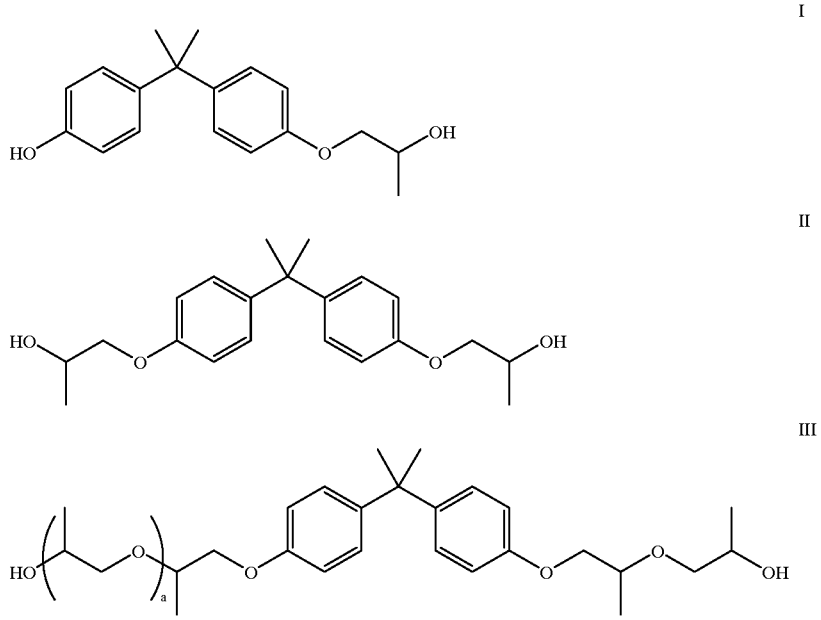

group is a radical moiety of the group selected from 2,2-bis-(4-hydroxy phenyl) propane, 2,2-bis-(3-hydroxy phenyl) propane, 2,2-bis-(2-hydroxy phenyl) propane, 2,2-bis-(3-hydroxy phenyl) propane, 2,2-bis-(5-hydroxy phenyl) propane, bisphenol A, ethoxylated bisphenol A, bis-(4-hydroxy phenyl) methane, 1,1-bis-(4-hydroxy phenyl) ethane and hydroquinone; and a multi step process for the preparation of polyester polymers, especially an unsaturated polyester resin, wherein the multi step process can be a two step or three step monomer addition process, and preferably a two step monomer addition process, comprising a first step of alkoxylating a diol such as bisphenol A or 2,2-di(4-hydroxyphenyl)-propane, with a cyclic alkylene carbonate such as ethylene carbonate, propylene carbonate, and the like in the presence of a suitable catalyst such as an alkali carbonate, such as potassium carbonate, followed by a second step comprising of the addition of a suitable diacid or dicarboxylic acid, such as fumaric acid, or a preferred embodiment there is a three step monomer addition process comprised of (i) alkoxylating a diol such as bisphenol A or 2,2-di(4-hydroxyphenyl)-propane, with a cyclic alkylene carbonate such as ethylene carbonate, propylene carbonate, and the like in the presence of a suitable catalyst such as an alkali carbonate, such as potassium carbonate; (ii) adding thereto a further amount of cyclic akylene carbonate in the presence of a second catalyst such as an alkali alkoxide, for example, sodium methoxide or potassium t-butoxide; and followed by (iii) the addition of a suitable diacid such as a dicarboxylic acid, and preferably fumaric acid. The polyester resin obtained is preferably an unsaturated polyester which can be subjected to crosslinking, especially reactive extrusion processes, to a high gel content, such as from about 0.1 to about 60 percent, and preferably from about 3 to about 45 percent gel, in the presence of an initiator such as a peroxide, like benzoyl or lauryl peroxide and which peroxide is selected in an amount of for example, from about 0.01 to about 5 weight percent of the resin. Toners containing crosslinked polyester resins exhibit, for example, desirable low temperature fixing characteristics such as from about 120° C. to about 145° C., and high offset properties such as from about 180° C. to about 225° C. Moreover, the present invention is related to an economical process for preparing an unsaturated polyester resin, such as for example, poly (propoxylated bisphenol A—co- fumarate), from three or more monomers or isomers of propoxylated bisphenol A and fumaric acid, and wherein the three or more isomers of propoxylated bisphenol A are obtained from the condensation of bisphenol A with a cyclic alkylene carbonate in the presence of first catalyst such as potassium carbonate, and optionally followed by the addition of a further amount of cyclic alkylene carbonate in the presence of a second catalyst such as sodium methoxide or potassium t-butoxide.

The preferred aforementioned resin, poly(propoxylated bisphenol A co-fumarate), can be prepared by a two step process comprised of (i) the alkoxylation of for example, from about 0.95 to about 1.05 mole percent of 2,2-di(4-hydroxyphenyl)-propane also known as bisphenol A, with for example, from about 1.95 to about 2.05 mole percent of propylene carbonate and for example, from about 0.0001 to about 0.2 mole percent of a catalyst such as potassium carbonate, at a suitable temperature of for example, from about 160 to about 205° C. for a suitable duration of from about 1 to about 9 hours, resulting in the formation of a mixture of propoxylated bisphenol A, comprised of 4-(2-hydroxyethyl)-bisphenol A, bis 4,4'-(2-hydroxyethyl)-bisphenol A, 4-(2'-hydroxyethyl-2-oxyethyl)-4'-(2-hydroxyethyl)-bisphenol A and/or higher ordered propoxylated bisphenol A polyols, illustrated as monomers I, II and III, respectively, as follows

FORMULA 1

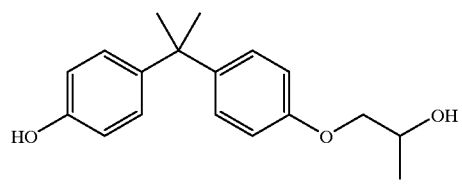

I

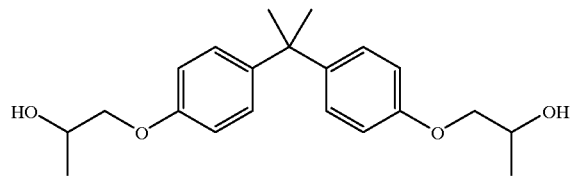

II

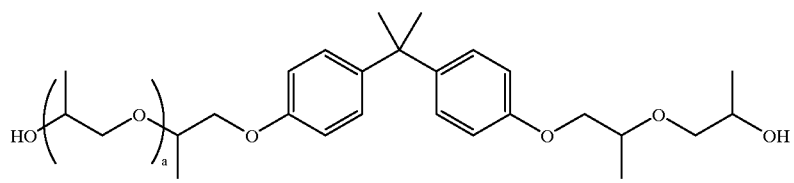

III wherein a is zero, 1, 2, or a mixture of zero, 1 and 2.

FORMULA 2

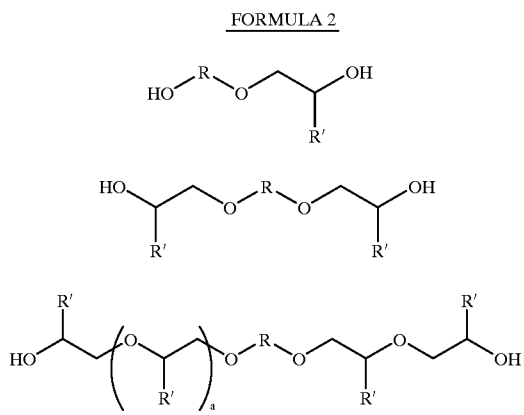

wherein R is an aromatic or aryl group; R' is an alkyl group or hydrogen and a is an integer or number of from about 0 to about 3; aromatic being, for example, aryl with, for example, 6 to about 30 carbon atoms; and alkyl containing, for example, 1 to about 25, and preferably about 12 carbon atoms.

The ratios of the propoxylated bisphenol A mixtures can vary, and in many instances, the ratio obtained, reference Formula 1, is from about 2 to about 5 weight percent of monomer I, and from about 95 to about 99 percent by weight of monomer II, and from about 0 to about 3 weight percent of monomer III, and provided that the total percentage sums of the three monomers are about 100 percent. The second step is generally comprised of a polyesterification of the aforementioned intermediate propoxylated bisphenol A, with from about 0.95 to about 1.05 mole percent of fumaric acid, at a temperature of, for example, from 180° C. to about 210° C. for a duration of from about 1 to about 6 hours, followed by reducing the pressure by, for example, from about 0.1 to about 40 mm-Hg for a suitable duration of preferably, for example, from about 1 to about 3 hours, to result in the formation of the unsaturated polyester, poly (propoxylated bisphenol A—co-fumarate).

In another specific embodiment of the present invention, the aforementioned mixture of propoxylated monomers I, II and III can be varied by the addition of an excess of alkylene carbonate in the presence of a second alkali alkoxide initiator such as potassium t-butoxide or sodium methoxide after the first aforementioned step. More specifically, in an embodiment of the present invention, the unsaturated polyester resin is prepared by a three step monomer addition process comprised of (i) the alkoxylation of for example, from about 0.95 to about 1.05 mole percent of 2,2-di(4-hydroxyphenyl)-propane also known as bisphenol A, with for example, from about 1.95 to about 2.05 mole percent of propylene carbonate and for example, from about 0.0001 to about 0.2 mole percent of a catalyst such as potassium carbonate, at a suitable temperature of, for example, from about 160 to about 205° C. for a suitable duration of, for example preferably from about 1 to about 9 hours, resulting in the formation of a mixture of propoxylated bisphenol A, comprised of about 2 to about 5 weight percent of monomer I (Formula 1), and from about 95 to about 99 percent by weight of monomer II, and from about 0 to about 3 weight percent of monomer III, and provided that the total percentage sums of the three monomers are about 100 percent; followed by (ii) the further addition of from about 0.05 to about 0.25 mole percent of propylene carbonate with from about 0.001 to about 0.3 mole percent of a second alkali alkoxide catalyst such as potassium t-butoxide at a temperature of from about 180° C. to about 205° C. for a suitable duration of for example preferably from about 1 to about 3 hours, and thereby resulting in a mixture of propoxylated bisphenol A comprised of, for example, of from about 0 to about 0.5 weight percent of monomer I, and from about 84 to about 99 percent by weight of monomer 2, and from about 3 to about 15 weight percent of monomer 3, and provided that the total percentage sums of the three monomers are about 100 percent; and followed by the third step generally comprised of a polyesterification of the aforementioned intermediate propoxylated bisphenol A, with from about 0.95 to about 1.05 mole percent of fumaric acid, at a temperature of for example, from 180 to about 210° C. under reduced pressure of, for example, from about 0.1 to about 40 mm-Hg for a suitable duration of preferably for example, from about 3 to about 6 hours, to result in the formation of the unsaturated polyester, poly(propoxylated bisphenol A—co-fumarate).

The aforementioned unsaturated polyester, poly (propoxylated bisphenol A-co-fumarate), can be subjected to crosslinking, especially reactive extrusion processes, to a high gel content, such as from about 0.1 to about 60 percent, and preferably from about 3 to about 45 percent gel, in the presence of an initiator such as a peroxide, like benzoyl or lauryl peroxide and which peroxide is selected in an amount of for example, from about 0.01 to about 5 weight percent of the resin. The unsaturated polyester resins is preferably derived from a mixture of propoxylated bisphenol A, and wherein the 4-(2-hydroxyethyl)-bisphenol A (Isomer I) is minimized or avoided due to the inhibition to high polymerization degree, and interference with the subsequent crosslinking with the peroxide initiator. These latter inhibition is primarily due to aryl hydroxide moieties (or phenolic). Thus, it is preferred that this isomer I, the 4 (2-hydroxyethyl)-bisphenol A, is minimized by this process or avoided and controlled to a level of less than about 1 weight percent of the isomeric mixture, and preferably minimized to less than about 0.1 weight percent, or more preferably to zero weight percent of the isomeric mixture (Formula 1).

This aforementioned mixture of propoxylated monomers I, II and III can be varied by the concentration of cyclic alkylene carbonate and type of catalyst. Generally, the alkali carbonate catalysts such as sodium carbonate, potassium carbonate, lithium carbonate and the like, are useful in the alkoxylation of aryl diols, such as bisphenol A and the likes, to yield primarily a mixture of wherein the bis 4,4'-(2-hydroxyethyl)-bisphenol A (isomer II of Formula 1), is the predominant product of from about 95 to about 100 weight percent, and isomer III is minimized of from about 0 to about 3 percent by weight. Also, the amount of isomer I, is usually from about 2 to about 5 percent by weight and this isomer may not be as effective for obtaining highly crosslinked resins due to its inhibition with peroxides. In the presence of an initiator such as an alkali alkoxide, for example, sodium methoxide, potassium methoxide, lithium methoxide, potassium t-butoxide and the likes, then the reaction of an aryl diol with a cyclic alkylene carbonates results in the formation of both the bis 4,4'-(2-hydroxyethyl)-bisphenol A (Isomer II) in an amount of from about 60 to about 85 weight percent, and 4-(2'-hydroxyethyl-2-oxyethyl)-4'-(2-hydroxyethyl)-bisphenol A and higher ordered polyols (Isomer III and wherein a is, for example, zero, 1, 2 or mixtures of 1 and 2) in an amount of from about 15 to about 40 percent by weight, and provided that the total percentage sums of the three monomers are about 100 percent: as illustrated in comparative Example VI. Hence, in order to control the reaction mixture such that the three isomeric intermediate propoxylated bisphenol A products are obtained in an amount comprised, for example, of from about 0 to about 1 weight percent of monomer I, and from about 84 to about 99 percent by weight of monomer II, and from about 3 to about 15 weight percent of monomer III, and provided that the total percentage sums of the three monomers are about 100 percent, it is necessary to provide a process which is comprised of the three aforementioned steps, that is, comprised of (i) the alkoxylation bisphenol A, propylene and a catalyst such as potassium carbonate, at a suitable temperature of, for example, from about 160° C. to about 205° C. for a suitable duration of, for example, preferably from about 1 to about 9 hours, resulting in the formation of a mixture of propoxylated bisphenol A, comprised of about 2 to about 5 weight percent of monomer I (Formula 1), and from about 95 to about 99 percent by weight of monomer II, and from about 0 to about 3 weight percent of monomer III, and provided that the total percentage sums of the three monomers are about 100 percent; (ii) followed by the addition of from about 0.05 to about 0.25 mole percent of propylene carbonate and for example, from about 0.0001 to about 0.01 mole percent of a second alkali alkoxide catalyst such as potassium t-butoxide at a temperature of from about 180 to about 205° C. for a suitable duration of for example preferably from about 1 to about 3 hours, and thereby resulting in a mixture of propoxylated bisphenol A comprised of, for example, of from about 0 to about 0.5 weight percent of monomer I, and from about 84 to about 97 percent by weight of monomer II, and from about 3 to about 15 weight percent of monomer III, and provided that the total percentage sums of the three monomers are about 100 percent.

The unsaturated polyester resin, poly(propoxylated bisphenol A co-fumarate), described in the two step monomer process and utilizing only the alkali carbonate catalyst, generally exhibits high glass transition temperatures of from about 58° C. to about 62° C. at a molecular weight of from about 15,000 to about 20,000 grams per mole as measured by gel permeation chromatography. In many instances, it is desired that toner resins exhibit high glass transition temperatures of from about 58° C. to about 62° C., such that toner blocking is avoided or minimized, as well as the minimization of copy to copy offset. In order to obtain a high glass transition temperatures of from about 58° C. to about 62° C. at a molecular weight of from about 15,000 to about 20,000 grams per mole, it is necessary that the unsaturated polyester resin is derived from the propoxylated bisphenol A mixture, wherein the predominant isomer (Formula 1) is comprised of from about 95 to about 99 weight percent of isomer II, and the isomer III is minimized of from about 0 to about 3 weight percent, because this latter isomer reduces the glass transition temperature of the resin. Conversely, in many instances, an unsaturated polyester resin, for example, poly(propoxylated bisphenol A—co-fumarate), with lower glass transition temperature such as from about 52° C. to about 57.9° C. is desired at a molecular weight of from about 15,000 to about 20,000 grams per mole as measured by gel permeation chromatography. Such unsaturated polyester resins with lower glass transition temperatures are useful in providing toners with low minimum fusing temperatures, thereby reducing the temperature of the fusing subsystem and reducing the energy consumption of the xerographic device. In order to obtain a lower glass transition temperatures of from about 52° C. to about 57.9° C. at a molecular weight of from about 15,000 to about 20,000 grams per mole, it is necessary that the unsaturated polyester resin is derived from the propoxylated bisphenol A mixture wherein the predominant isomer (Formula 1) is comprised of from about 84 to about 97 weight percent of isomer II, and the isomer III is comprised of from about 3 to about 15 weight percent of the isomeric mixture. If isomer III is present in an amount of more than about 15 weight percent, than the corresponding unsaturated resin will be proportionally lower in glass transition temperature. The aforementioned unsaturated poly(propoxylated bisphenol A-co-fumarate) of lower glass transition temperatures of from about 52° C. to about 57.9° C., can be obtained by the aforementioned three step process wherein the alkali carbonate is utilized in the first step, followed by the utilization of excess alkylene carbonate and alkali alkoxide catalyst in the second step, followed by the poly-esterification as described in the third step; and two step process comprising (i) charging a condensation type vessel equipped with a distillation apparatus, and vacuum line, with from about 0.95 to about 1.05 mole percent of a diol such as 2,2-bis(4-hydroxyphenyl)-propane, from about 1.95 to about 2.05 mole percent of a cyclic alkylene carbonate, with for example from about 1 to about 25, and preferably from about 2 to about 12 carbon atoms, a cyclic carbonate such as ethylene carbonate, 1,2-propylene carbonate, 1,2-butylene carbonate, and the like and from about 0.001 to about 0.05 mole weight percent of a catalyst such as an alkali metal carbonate, such as potassium or sodium carbonate, followed by heating the mixture to, for example, a suitable temperature, of from 160° C. to about 205° C. for a duration of, for example, about 3 to about 9 hours and resulting in a mixture of propoxylated bisphenol-A intermediate; (ii) adding from about 0.95 to about 1.05 mole percent of a diacid such as fumaric acid, and heating the mixture with stirring to about 195° C. to about 220° C. for a duration of from about 3 to about 6 hours, and reducing the pressure of from about atmospheric pressure (760 Torr) to about 2 Torr over a period, for example, from about 1 to about 3 hours, and followed by pressurizing the vessel to atmospheric pressure and discharging the resin through a bottom valve; a three step process comprising (i) charging a condensation type vessel equipped with a distillation apparatus, and vacuum line, with from about 0.95 to about 1.05 mole percent of a diol such as 2,2-bis(4-hydroxyphenyl)-propane, from about 1.95 to about 2.05 mole percent of a cyclic alkylene carbonate, with for example from about 1 to about 25, and preferably from about 2 to about 12 carbon atoms, cyclic carbonate such as ethylene carbonate, 1,2-propylene carbonate, 1,2-butylene carbonate, and the like and from about 0.001 to about 0.05 mole weight percent of a catalyst such as an alkali metal carbonate, such as potassium or sodium carbonate, followed by heating the mixture to, for example, a suitable temperature, of from 160° C. to about 205° C. for a duration of, for example, about 2 to about 10 hours and resulting in a mixture of propoxylated bisphenol-A intermediate; (ii) adding thereto of from about 0.05 o about 0.25 moles of alkylene carbonate such as ethylene propylene carbonate and a second alkali alkoxide catalyst such as sodium methoxide potassium t-butoxide, and the like in an amount of from about 0.001 to about 0.05 mole weight percent, and continue heating at a temperature of from about 185° C. to about 205° C. for a duration of from about 0.5 hours to about 3 hours; followed by (iii) adding from about 0.95 to about 1.05 mole percent of a diacid such as fumaric acid, and heating the mixture with stirring to about 195° C. to about 220° C. for a duration of from about 3 to about 6 hours, and reducing the pressure of from about atmospheric pressure (760 Torr) to about 2 Torr over a period for example from about 1 to about 3 hours, and followed by pressurizing the vessel to atmospheric pressure and discharging the resin through a bottom valve.

Examples of polyesters obtained with the processes of the present invention are poly(propoxylated bisphenol co-fumarate), poly(ethoxylated bisphenol co-fumarate), poly(butyloxylated bisphenol co-fumarate), poly(co-propoxylated bisphenol co ethoxylated bisphenol co-fumarate), poly(propoxylated bisphenol co-maleate), poly(propoxylated bisphenol co-itaconate), poly(1,2-propylene fumarate), poly(propoxylated bisphenol co-maleate), poly(ethoxylated bisphenol co-maleate), poly (butyloxylated bisphenol co-maleate), and poly(co-propoxylated bisphenol co ethoxylated bisphenol co-maleate).

Specific examples of diols selected for the process of the present invention include for example, alkylene diols such as ethane diol, 1,2-propanediol, 1,3-propanediol, 1,3-butanediol, pentylene glycol, hexylene glycol, diphenol, neopentyl glycol, diethylene glycol, dipropylene glycol, 2,2-bis-(4-hydroxy phenyl) propane, 2,2-bis-(3-hydroxy phenyl) propane, 2,2-bis-(2-hydroxy phenyl) propane, 2,2-bis-(3-hydroxy phenyl) propane, 2,2-bis-(5-hydroxy phenyl) propane, bisphenol A, ethoxylated bisphenol A, propoxylated bisphenol A, bis-(4-hydroxy phenyl) methane, 1,1-bis-(4-hydroxy phenyl) ethane, cis-1,4-dihydroxy-cyclohexane, trans-1,4-dihydroxy-cyclohexane, cis-1,2-dihydroxy-cyclohexane, trans-1,2-dihydroxy-cyclohexane, trans-1,3-dihydroxy-cyclohexane, cis-1,3-dihydroxy-cyclohexane, mixtures thereof and the like inclusive of other known diols; and which diols are employed, for example, in an amount of from about 0.95 mole equivalents to about 1.05 mole equivalents, based on about 1 mole equivalent of dicarboxylic acid utilized.

Dicarboxylic acids examples, especially diacids selected for the process of the present invention include fumaric acid, malonic acid, itaconic acid, 2-methylitaconic acid, maleic acid, maleic anhydride, adipic acid, succinic acid, suberic acid, 2-ethyl succinic acid, glutaric acid, dodecylsuccinic acid, 2-methyladipic acid, pimelic acid, azeilic acid, sebacic acid, terephthalic acid, isophthalic acid, phthalic acid, 1,2-cyclohexanedioic acid, 1,3-cyclohexanedioic acid, 1,4-cyclohexanedioic acid, dialkyl esters wherein the alkyl groups are from about 1 carbon chain to 23 and preferably from about 2 to about 18 carbon chains, and are esters of malonate, succinate, fumarate, itaconate, terephthalate, isophthalate, phthalate, cyclohexanedioate, mixture thereof, and which diacids are employed, for example, in an amount of from about 10 to about 60 percent by weight, and preferably from about 25 to about 50 percent by weight by weight of the reactants.

Examples of cyclic alkylene carbonates selected for the process of the present invention contain from about 3 to about 25 carbon atoms, include ethylene carbonate, 1,2-propylene carbonate, and 1,2-butylene carbonate, mixture thereof and the like, which alkylene carbonates are employed, for example, in an amount of from about 1.95 mole equivalents to about 2.40 mole equivalents, based on about 1 mole equivalent of organic diol utilized.

First catalyst examples selected for the process of the present invention include alkali carbonates such as sodium carbonate, lithium carbonate, potassium carbonate, sodium carbonate, rubidium carbonate, cesium carbonate, beryllium carbonate, magnesium carbonate, calcium carbonate, strontium carbonate, beryllium carbonate, manganese carbonate, barium carbonate and the likes, which are employed, for example, in an amount of from about 0.001 to about 0.1 mole equivalents, based on about 1 mole equivalent of organic diol utilized.

Second catalyst examples selected for the process of the present invention include alkali alkoxides such as lithium methoxide, lithium ethoxide, lithium propoxide, lithium butoxide, lithium isopropoxide, lithium isobutoxide, lithium t-butoxide, potassium methoxide potassium ethoxide, potassium propoxide, potassium butoxide, potassium isopropoxide, potassium isobutoxide, potassium t-butoxide, sodium methoxide, sodium ethoxide, sodium propoxide, sodium butoxide, sodium isopropoxide, sodium isobutoxide, sodium t-butoxide, lithium iodide, sodium iodide, potassium iodide, sodium hydroxide, potassium hydroxide, lithium hydroxide, mixture thereof and the like, and which catalysts are employed, for example, in an amount of from about 0.001 mole equivalent to about 0.1 mole equivalent, based on about 1 mole equivalent of organic diol utilized.

Various known suitable colorants, such as dyes, pigments, and mixtures thereof and present in the toner containing the polyester generated with the processes of the present invention in an effective amount of, for example, from about 1 to about 25 percent by weight of the toner, and preferably in an amount of from about 2 to about 12 weight percent, include carbon black like REGAL 330®; magnetites, such as Mobay magnetites M08029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E. I. DuPont de Nemours & Company, and the like. Generally, colorants that can be selected are black, cyan, magenta, or yellow, and mixtures thereof. Examples of magentas are 2,9-dimethyl-substituted quinacridone and anthraquinone dye identified in the Color Index as Cl 60710, Cl Dispersed Red 15, diazo dye identified in the Color Index as Cl 26050, Cl Solvent Red 19, and the like. Illustrative examples of cyans include copper tetra(octadecyl sulfonamido) phthalocyanine, x-copper phthalocyanine pigment listed in the Color Index as Cl 74160, Cl Pigment Blue, and Anthrathrene Blue, identified in the Color Index as Cl 69810, Special Blue X-2137, and the like; while illustrative examples of yellows are diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants can be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF).

Various known suitable effective positive or negative charge enhancing additives can be selected for incorporation into the toner compositions of the present invention, preferably in an amount of about 0.1 to about 10, more preferably about 1 to about 3, percent by weight. Examples of the additives include quaternary ammonium compounds inclusive of alkyl pyridinium halides; alkyl pyridinium compounds, reference U.S. Pat. No. 4,298,672, the disclosure of which is totally incorporated hereby by reference; organic sulfate and sulfonate compositions, U.S. Pat. No. 4,338,390, the disclosure of which is totally incorporated hereby by reference; cetyl pyridinium tetrafluoroborates; distearyl dimethyl ammonium methyl sulfate; aluminum salts such as BONTRON E84™ or E88™ (Hodogaya Chemical); and the like.

There can also be blended with the toner compositions of the present invention other toner additives, such as external additive particles including flow aid additives, which additives are usually present on the surface thereof. Examples of these additives include metal oxides like titanium oxide, tin oxide, mixtures thereof, and the like, colloidal silicas, such as AEROSIL®, metal salts and metal salts of fatty acids inclusive of zinc stearate, aluminum oxides, cerium oxides, and mixtures thereof, which additives are generally present in an amount of from about 0.1 percent by weight to about 5 percent by weight, and preferably in an amount of from about 0.1 percent by weight to about 1 percent by weight. Several of the aforementioned additives are illustrated in U.S. Pat. Nos. 3,590,000 and 3,800,588, the disclosures which are totally incorporated herein by reference. Also, there can be selected as additives the coated silicas of copending applications U.S. Serial No. (not yet assigned—D/97370); U.S. Serial No. (not yet assigned—D/97363); U.S. Serial No. (not yet assigned—D/97365), the disclosures of which are totally incorporated herein by reference.

Various known crosslinking agents or chemical initiators can be selected for the crosslinking of the prepared unsaturated polyester resins, and which agents are selected in an effective amount of, for example, from about 0.5 to about 5 percent by weight of the toner, and preferably in an amount of from about 1 to about 5 weight percent, such agents including preferably peroxides such as organic peroxides or azo-compounds for the generation of crosslinked toner resins of the invention. Suitable organic peroxides include diacyl peroxides such as, for example, decanoyl peroxide, lauroyl peroxide and benzoyl peroxide, ketone peroxides such as, for example, cyclohexanone peroxide and methyl ethyl ketone, alkyl peroxy esters such as, for example, t-butyl peroxy neodecanoate, 2,5-dimethyl 2,5-di (2-ethyl hexanoyl peroxy) hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, oo-t-butyl o-isopropyl mono peroxy carbonate, 2,5-dimethyl 2,5-di (benzoyl peroxy) hexane, oo-t-butyl o-(2-ethyl hexyl) mono peroxy carbonate, and oo-t-amyl o-(2-ethyl hexyl) mono peroxy carbonate, alkyl peroxides such as, for example, dicumyl peroxide, 2,5-dimethyl 2,5-di (t-butyl peroxy) hexane, t-butyl cumyl peroxide, _-_-bis (t-butyl peroxy) diisopropyl benzene, di-t-butyl peroxide and 2,5-dimethyl 2,5-di (t-butyl peroxy) hexyne-3, alkyl hydroperoxides such as, for example, 2,5-dihydro peroxy 2,5-dimethyl hexane, cumene hydroperoxide, t-butyl hydroperoxide and t-amyl hydroperoxide, and alkyl peroxyketals such as, for example, n-butyl 4,4-di (t-butyl peroxy) valerate, 1,1-di (t-butyl peroxy) 3,3,5-trimethyl cyclohexane, 1,1-di (t-butyl peroxy) cyclohexane, 1,1-di (t-amyl peroxy) cyclohexane, 2,2-di (t-butyl peroxy) butane, ethyl 3,3-di (t-butyl peroxy) butyrate and ethyl 3,3-di (t-amyl peroxy) butyrate. Suitable azo-compounds include azobis-isobutyronitrile, 2,2'-azobis (isobutyronitrile), 2,2'-azobis (2,4-dimethyl valeronitrile), 2,2'-azobis (methyl butyronitrile), 1,1'-azobis (cyano cyclohexane) and other similar known compounds.

By permitting use of low concentrations of chemical initiator and utilizing substantially all of it in the crosslinking reaction, usually in the concentration range of from about 0.01 to about 10 weight percent, and preferably in the range from about 0.1 to about 4 weight percent, the residual contaminants produced in the crosslinking reaction in preferred embodiments can be minimal. Since the crosslinking can be accomplished at high temperature such as from about 120° C. to 180° C., the reaction is rapid (e.g., less than 10 minutes, preferably about 2 seconds to about 5 minutes residence time) and thus little or no unreacted initiator remains in the product.

The low melt toners and toner resins may be prepared by a reactive melt mixing process wherein reactive polyester resins are partially crosslinked. For example, low melt toner resins and toners may be fabricated by a reactive melt mixing process as illustrated for example, in U.S. Pat. No. 5,376,494, the disclosures of which are totally incorporated herein by reference, and for example comprising the steps of (1) melting a reactive base unsaturated polyester resin obtained as illustrated herein, thereby forming a polymer melt, in a melt mixing device; (2) initiating crosslinking of the polymer melt, preferably with a chemical crosslinking initiator and increased reaction temperature; (3) retaining the polymer melt in the melt mixing device for a sufficient residence time that a partial crosslinking of the base resin may be achieved; (4) providing sufficiently high shear during the crosslinking reaction to retain the gel particles formed during crosslinking small in size and well distributed in the polymer melt; (5) optionally de-volatilizing the polymer melt to remove any effluent volatile. The high temperature reactive melt mixing process allows for a rapid crosslinking which enables the production of substantially only microgel particles, and the high shear of the process prevents undue growth of the microgels and enables the microgel particles to be uniformly distributed in the resin.

The crosslinking of the unsaturated polyesters comprises, for example, the steps of (1) feeding the unsaturated polyester base resin generated with a process embodiment of the present invention and initiator to an extruder; (2) melting the base resin, thereby forming a polymer melt; (3) mixing the molten base resin and initiator at low temperature to enable a dispersion of the initiator in the base resin prior to the onset of crosslinking; (4) initiating crosslinking of the base resin with the initiator by raising the melt temperature and controlling it along the extruder channel; (5) retaining the polymer melt in the extruder for a sufficient residence time at a given temperature such that the required amount of crosslinking is achieved; (6) providing sufficiently high shear during the crosslinking reaction thereby keeping the gel particles formed during crosslinking small in size and well distributed in the polymer melt; (7) optionally devolatilizing the melt to remove any effluent volatile; and (8) pumping the crosslinked resin melt through a die to a pelletizer.

A reactive melt mixing process can be considered a process wherein chemical reactions can be completed on the polymer in the melt phase in a melt mixing device, such as an extruder. In preparing the toner resins these reactions can be used to modify the chemical structure and the molecular weight, and thus the melt rheology and fusing properties, of the polymer. Reactive melt mixing is particularly efficient for highly viscous materials, and is advantageous primarily since it can require no solvents, and thus is easily environmentally controlled. It is also advantageous because it permits a high degree of initial mixing of resin and initiator to take place, and provides an environment wherein a controlled high temperature (adjustable along the length of the extruder) is available so that a very quick reaction can occur, and enables a reaction to take place continuously, and thus the reaction is not limited by the disadvantages of a batch process, wherein the reaction must be repeatedly stopped so that the reaction products may be removed and the apparatus cleaned and prepared for another similar reaction. Once the amount of crosslinking desired is achieved, the reaction products can be quickly removed from the reaction chamber.

The resins obtained are generally present in the toner in an amount of from about 40 to about 98 percent by weight, and more preferably from about 70 to about 98 percent by weight, although they may be present in greater or lesser suitable amounts. For example, the polyester toner resins of the present invention can be subsequently melt blended or otherwise mixed with a colorant, charge carrier additives, surfactants, emulsifiers, pigment dispersants, flow additives, and the like. The resultant product can then be pulverized by known methods such as milling to form toner particles. The toner particles preferably have an average volume particle diameter of about 5 to about 25, more preferably about 5 to about 15 microns.

The polyesters generated with the processes of the present invention can be subjected to further reactions as indicated herein and more specifically to reactive extrusion reactions. The present invention provides a low fix temperature toner resin, and specifically a low fix temperature toner resin based on crosslinked resin comprised of crosslinked and linear portions, the crosslinked portion consisting essentially of microgel particles with an average volume particle diameter up to 0.1 micron, preferably about 0.005 to about 0.1 micron, said microgel particles being substantially uniformly distributed throughout the linear portions. This resin may be prepared by a reactive melt mixing process, including a process disclosed in detail in U.S. Pat. No. 5,376,494, the disclosure of which is hereby totally incorporated herein by reference. In this resin the crosslinked portion consists essentially of microgel particles, preferably up to about 0.1 micron in average volume particle diameter as determined by scanning electron microscopy and transmission electron microscopy. When produced by a reactive melt mixing process wherein the crosslinking occurs at high temperature and under high shear, the size of the microgel particles does not continue to grow with increasing degree of crosslinking. Also, the microgel particles are distributed substantially uniformly throughout the linear portion.

The crosslinked portions or microgel particles are prepared in such a manner that there is substantially no distance between the polymer chains. Thus the crosslinking is preferably not accomplished via monomer or polymer bridges. The polymer chains are directly connected, for example at unsaturation sites or other reactive sites, or in some cases by a single intervening atom such as, for example, oxygen. Therefore, the crosslinked portions are very dense and do not swell as much as gel produced by conventional crosslinking methods. This crosslink structure is different from conventional crosslinking in which the crosslink distance between chains is quite large with several monomer units, and where the gels swell very well in a solvent such as tetrahydrofuran or toluene. These highly crosslinked dense microgel particles distributed throughout the linear portion impart elasticity to the resin which improves the resin offset properties, while not substantially affecting the resin minimum fix temperature.

The crosslinked polyester toner resin contains for example, a weight fraction of the microgel (gel content) in the resin mixture in the range typically from about 0.001 to about 50 weight percent, preferably about 0.1 to about 40 or 10 to 19 weight percent. The linear portion is comprised of base resin, preferably unsaturated polyester, in the range from about 50 to about 99.999 percent by weight of the toner resin, and preferably in the range from about 60 to about 99.9 or 81 to 90 percent by weight of the toner resin. The linear portion of the resin preferably consists essentially of low molecular weight reactive base resin which did not crosslink during the crosslinking reaction, and is preferably an unsaturated polyester resin. The number-average molecular weight ($M_n$) of the linear portion as measured by gel permeation chromatography (GPC) is in the range typically from about 1,000 to about 20,000, and preferably from about 2,000 to about 5,000. The weight average molecular weight ($M_w$) of the linear portion is in the range typically from about 2,000 to about 40,000, and preferably from about 4,000 to about 15,000. The molecular weight distribution ($M_w/M_n$) of the linear portion is in the range typically from about 1.5 to about 6, and preferably from about 2 to about 4. The onset glass transition temperature (Tg) of the linear portion as measured by differential scanning calorimeter (DSC) for preferred embodiments is in the range typically from about 50° C. to about 70° C., and preferably from about 51° C. to about 60° C. Melt viscosity of the linear portion of preferred embodiments as measured with a mechanical spectrometer at 10 radians per second is from about 5,000 to about 200,000 poise, and preferably from about 20,000 to about 100,000 poise, at 100° C. and decreases sharply with increasing temperature to from about 100 to about 5,000 poise, and preferably from about 400 to about 2,000 poise, as temperature rises from 100° C. to 130° C.

The toner resin can contain a mixture of crosslinked resin microgel particles and a linear portion as illustrated herein. In embodiments of the toner resin of the invention, the onset Tg is in the range typically from about 50° C. to about 70° C., and preferably from about 51° C. to about 60° C., and the melt viscosity as measured with a mechanical spectrometer at 10 radians per second is from about 5,000 to about 200,000 poise, and preferably from about 20,000 to about 100,000 poise, at 100° C. and from about 10 to about 20,000 poise at 160° C.

The low fix temperature of the toner resin is a function of the molecular weight and molecular weight distribution of the linear portion, and is not affected by the amount of microgel particles or degree of crosslinking. This is portrayed by the proximity of the viscosity curves at low temperature (such as, for example, at 100° C.) in which the melt viscosity is in the range from about 20,000 to about 100,000 poise as measured with a mechanical spectrometer at 10 radians per second. The hot offset temperature is increased with the presence of microgel particles which impart elasticity to the resin. With a higher degree of crosslinking or microgel content, the hot offset temperature increases. This is reflected in divergence of the viscosity curves at high temperature (such as, for example, at 160° C.) in which the melt viscosity is typically in the range from about 10 to about 20,000 poise as measured at 10 radians per second depending on the amount of microgel particles in the resin.

The toner resin can provide a low melt toner with a minimum fix temperature of from about 100° C. to about 200° C., preferably about 100° C. to about 160° C., more preferably about 110° C. to about 140° C., provide the low melt toner with a wide fusing latitude to minimize or prevent offset of the toner onto the fuser roll, and maintain high toner pulverization efficiencies. The low melt toner resin preferably has a fusing latitude greater than 10° C., preferably from about 10° C. to about 120° C., and more preferably more than about 20° C. and even more preferably more than about 30° C. The MFT of the toner is not believed to be sensitive to the crosslinking in the microgel particles of the toner resin, while the fusing latitude increases significantly as a function of the crosslinking or content of microgels in the toner resin. Thus, it is possible to produce a series of toner resins and thus toners with the same MFT, but with different fusing latitudes. Toner resins and thus toners of the present invention show minimized or substantially no vinyl offset. As the degree of crosslinking or microgel content increases, the low temperature melt viscosity does not change appreciably, while the high temperature melt viscosity goes up. In an exemplary embodiment, the hot offset temperature can increase approximately 30 percent. This can be achieved by crosslinking in the melt state at high temperature and high shear such as, for example, by crosslinking an unsaturated polyester using a chemical initiator in an extruder resulting in the formation of microgel alone, distributed substantially uniformly throughout the linear portion, and substantially no intermediates or sol portions which are crosslinked polymers with low crosslinking density. When crosslinked intermediate polymers are generated by conventional polymerization processes, the viscosity curves generally shift in parallel from low to high degree of crosslinking. This is reflected in increased hot offset temperature, but also increased minimum fix temperature. In a preferred embodiment, the crosslinked portion consists essentially of very high molecular weight microgel particles with high density crosslinking (as measured by gel content) and which are not soluble in substantially any solvents such as, for example, tetrahydrofuran, toluene and the like. The microgel particles are highly crosslinked polymers with a very small, if any, crosslink distance. This type of crosslinked polymer may be formed by reacting chemical initiator with linear unsaturated polymer, and more preferably linear unsaturated polyester, at high temperature and under high shear. The initiator molecule breaks into radicals and reacts with one or more double bond or other reactive site within the polymer chain forming a polymer radical. This polymer radical reacts with other polymer chains or polymer radicals many times, forming a highly and directly crosslinked microgel. This renders the microgel very dense and results in the microgel not swelling very well in solvent. The dense microgel also imparts elasticity to the resin and increases its hot offset temperature while not affecting its minimum fix temperature.

The weight fraction of the microgel (gel content) in the resin may be defined as follows:

Gel Content=Total Sample Weight minus the Weight of Soluble Polymer (Total Sample Weight)×100 percent.

The gel content may be calculated by measuring the relative amounts of linear, soluble polymer and the nonlinear, crosslinked polymer utilizing the following procedure: (1) the sample of the crosslinked resin to be analyzed, in an amount between 145 and 235 milligrams, is weighed directly into a glass centrifuge tube; (2) 45 milliliters toluene is added and the sample is put on a shaker for at least 3 hours, preferably overnight; (3) the sample is then centrifuged at about 2500 rpm for 30 minutes and then a 5 milliliters aliquot is carefully removed and put into a pre-weighed aluminum dish; (4) the toluene is allowed to air evaporate for about 2 hours, and then the sample is further dried in a convection oven at 60° C. for about 6 hours or to constant weight; (5) the sample remaining, times nine, gives the amount of soluble polymer. Thus, utilizing this quantity in the above equation, the gel content can be easily calculated.

Linear unsaturated polyesters selected as the base resin are low molecular weight condensation polymers which may be formed by the step-wise reactions between both saturated and unsaturated diacids (or anhydride) and dihydric alcohols (glycols or diols) and by the multi step processes illustrated herein, and more specifically, by a process which comprises reacting an organic diol with an akylene carbonate in the presence of an alkali carbonate catalyst to thereby form a bis- alkoxy diol, followed optionally by further reacting the bis-alkoxy diol with a cyclic akylene carbonate in the presence of a second alkali alkoxide catalyst, and followed by polycondensing the resulting mixture with an unsaturated diacid and wherein the bis-alkoxy diol is comprised of the isomers with from about 0 to about 5 weight percent of isomer I, from about 80 to about 99 weight percent of isomer II, and from about 0.1 to about 15 weight percent of isomer III, and provided that the sum of I, II, and III is about 100 percent and wherein the isomers are of the formula as represented in Formula 1.

The following Examples are being provided to further illustrate various species of the present invention, it being noted that these Examples are intended to illustrate and not limit the scope of the present invention.

COMPARATIVE EXAMPLE I

An unsaturated polyester resin, poly(propoxylated bisphenol co-fumarate), derived from 1 mole equivalent of fumaric acid and 1 mole equivalent of a mixture of about 4.6 percent by weight of 4-(2-hydroxyethyl)-bisphenol A, 92 percent by weight of bis 4,4'-(2-hydroxyethyl)-bisphenol A, and 3 percent by weight of 4-(2'-hydroxyethyl-2-oxyethyl)-4'(2-hydroxyethyl)-bisphenol A, obtained from Milliken Chemical Company as Synfac 8029 was prepared as follows.

A 2 liter Hoppes Reactor equipped with a vacuum line, and distillation apparatus was charged with of 905 grams of propoxylated bisphenol A and obtained from Milliken Chemical Company as Synfac 8029, and analyzed by LC chromatography as a mixture of 4.6 percent by weight of 4-(2-hydroxyethyl)-bisphenol A, 92 percent by weight of bis 4,4'-(2-hydroxyethyl)-bisphenol A, and 3 percent by weight of 4-(2'-hydroxyethyl-2-oxyethyl)-4'-(2-hydroxyethyl)-bisphenol A. To this was added 306 grams of fumaric acid and 220 milligrams of hydroquinone, and the reactor was then heated to a temperature of about 208° C. over a 1.5 hour period, after which the mixture was maintained at this temperature for an additional 3 hours during which time the pressure was reduced from atmospheric pressure, 760 to about 7 TORR, and water was collected in the distillation receiver. The reactor was then pressurized to atmospheric pressure (about 760 Torr), and the resin was discharged through the bottom drain valve into a container and allowed to cool to ambient temperature (about 25° C.) overnight (about 16 hours). The resin product poly(propoxylated bisphenol co-fumarate), exhibited a glass transition temperature (onset) of 56.2° C. using the DuPont differential scanning calorimeter and obtained during the second heating cycle of the resin at a heating rate of 10° C. per minute. The melt index of this resin was found to be 31.5 grams per 10 minute using a 2.16 kilograms weight at a temperature of 117° C. The softening point of this resin using the Mettler softening point apparatus was found to be 108.6° C. The weight average molecular weight was found to be 13,600 grams/mole and the number average molecular weight was found to be 3,500 grams/mole with a polydispersity of 3.9 as measured by the gel permeation chromatography and using tetrahydrofuran as the solvent and polystyrene as the standard. The acid number of this resin was found to be 12.9 milligrams of KOH per gram of sample.

Three hundred (300) grams of the above unsaturated polyester obtained was dry-blended using a jar mill with 2.0 grams of Lucidol 75, a benzoyl peroxide with 25 percent water, which peroxide was obtained from Elf Atochem. The resulting blended mixture was extruded through an APV 15 millimeters twin screw extruder, which were set at 330° F. The extrudate strand from the extruder die was cooled in a water bath and the solid strands resulting were air-dried and then crushed into fine particles (95 percent by weight passing through 3.36 millimeters sieve) of less than about 3 millimeters in dimension. The gel content of the crosslinked product (A), defined as the percentage of toluene insoluble portion not passing through a 0.45 micron filter in a filtration procedure, was found to be about a low 7.5 percent. The above polyester resin product was not effectively crosslinked utilizing Lucidol 75, primarily because of the presence of about 4.6 percent of isomer I, in the resin which is believed to inhibit the crosslinking reaction.

Drawbacks or disadvantages in this Comparative Example include both economics and resin properties obtained. More specifically, the propoxylated bisphenol A obtained from Milliken Chemical Company as Synfac 8029, was obtained commercially at a higher cost of from about 20 to about 50 percent more than the reactants selected for the present invention, mainly because it is obtained from the anionic reaction of bisphenol A and propylene oxide, followed by purification. Furthermore, the isomers of propoxylated bisphenol A (Formula 1) contains up to 3 percent of the third isomer and resulting in an unsaturated polyester resin with a glass transition of 56.2° C., and although this resin is useful in many applications, there is a need for a resin of higher Tg, such as from about 58 to about 62° C., such that higher blocking temperatures can be obtained as well as minimized copy to copy offset or reduced vinyl offset properties. Additionally, due to the presence of about 4.5 percent by weight of Isomer I, the crosslinking of the resin with Lucidol 75, resulted in low gel content.

EXAMPLE II

An unsaturated polyester resin, poly(propoxylated bisphenol co-fumarate), derived from 1 mole equivalent of fumaric acid, 2.0 mole equivalent of propylene carbonate and 1 mole equivalent bisphenol A, was prepared in a two-step process using potassium carbonate as the condensation catalyst in the first step.

In the first step, a 2 liter Hoppes Reactor equipped with a vacuum line, and distillation apparatus was charged with 600 grams of Bisphenol A obtained from Shell Chemical, 599.6 grams of propylene carbonate obtained as Jeffsol PC from Huntsman chemicals, and 1.2 grams of potassium carbonate. The mixture was heated to 190° C. over a 1 hour period with stirring and maintained at that temperature for an additional 4 hours. A sample (about 1 grams) of this mixture was analyzed by LC chromatography, wherein it was found to 2.8 percent by weight of 4-(2-hydroxyethyl)-bisphenol A (Isomer I), 96.5 percent by weight of bis 4,4'-(2-hydroxyethyl)-bisphenol A (Isomer II), and 0.7 percent by weight of 4-(2'-hydroxyethyl-2-oxyethyl)-4'-(2-hydroxyethyl)-bisphenol A (Isomer III), reference Formula 1 throughout.

In the second step, the reactor was then charged with 306 grams of fumaric acid (resin grade) from Bartek Ingredients Ink Company, 1.2 grams of butylstannoic acid obtained as FASCAT 4100 from Elf Atochem, and 220 milligrams of hydroquinone. The temperature was then raised to 190° C. over a 2 hour period, and the pressure was then reduced to 6.5 Torr over a 3 hour period, wherein water was collected in the distillation receiver. The resin, poly(propoxylated bisphenol A co-fumarate), was then discharged through the bottom drain valve, and exhibited a glass transition temperature (onset) of 60.5° C. using the DuPont differential scanning calorimeter and obtained during the second heating cycle of the resin at a heating rate of 10° C. per minute. The melt index of this resin was found to be 23.4 grams per 10 minute using a 2.16 Kg weight at a temperature of 117° C. The softening point of this resin using the Mettler softening point apparatus was found to be 111.9° C. The weight average molecular weight was found to be 11,000 grams/mole and the number average molecular weight was found to be 4,700 grams/mole with a polydispersity of 2.7 as measured by the gel permeation chromatography and using tetrahydrofuran as the solvent and polystyrene as the standard. The acid number of this resin was 26.3 milligrams of KOH per gram of sample.

The advantages of this process is both economics and resin property obtained. More specifically, the propoxylated bisphenol is obtained directly from bisphenol A and propylene carbonate, and does not involve a purification. Furthermore, by this process, less than 1 percent of the third Isomer (Formula 1) was obtained, and there resulted a polyester resin of a higher glass transition temperature (60.5° C.), which resin was more useful as a toner binder in order to prevent blocking or copy offset, as compared to the resin of Comparative Example I, wherein a Tg of 56° C. was obtained, rendering a toner with this resin prone to blocking and offset.

Three hundred (300) grams of the unsaturated polyester obtained was weighed and dry-blended using a jar mill with 2.0 grams of Lucidol 75, a benzoyl peroxide with 25 percent water obtained from Elf Atochem. The resulting blended mixture was extruded through an APV 15 millimeter twin screw extruder, which were set at 330° F. The extrudate strand from the extruder die was cooled in a water bath and the solid strands resulting were air-dried and then crushed into fine particles (95 percent by weight passing through 3.36 millimeters sieve) of less than about 3 millimeters in dimension. The melt index of the crosslinked product (A) was found to be 4.2 gram per 10 minutes using 16.6 kilograms weight at a temperature of 125° C. on a Tinius-Olsen Extrusion Plastometer. The gel content of the crosslinked product (A), defined as the percentage of toluene insoluble portion not passing through a 0.45 micron filter in a filtration procedure, was found to be 30.5 percent. In view of the lower amount of Isomer I present, about 2.8 weight percent, a higher gel content of about 30.5 percent was obtained as compared to Comparative Example I, wherein only 7.5 percent gel was obtained due, it is believed, to the presence of a higher amount of about 4.6 percent of Isomer I, which is believed to inhibit the crosslinking of the resin with the peroxide.

EXAMPLE III

An unsaturated polyester resin poly(propoxylated bisphenol co-fumarate), derived from 1 mole equivalent of fumaric acid, 2.05 mole equivalent of propylene carbonate and 1 mole equivalent of bisphenol A was prepared in a two-step process and using potassium carbonate as the condensation catalyst in the first step.

In the first step, a 2 Hoppes Reactor equipped with a vacuum line, and distillation apparatus was charged with 600 grams of bisphenol A obtained from Shell Chemical, 614.6 grams of propylene carbonate obtained as Jeffsol PC from Huntsman Chemicals, and 1.2 grams of potassium carbonate. The mixture was heated to 190° C. over a 1 hour period with stirring and maintained at that temperature for an additional 4 hour. A sample of this mixture was analyzed by LC chromatography, wherein it was found to contain 2.8 percent by weight of 4-(2-hydroxyethyl)-bisphenol A (Isomer I), 97 percent by weight of bis 4,4'-(2-hydroxyethyl)-bisphenol A (Isomer II), and 0.2 percent by weight of 4-(2'-hydroxyethyl-2-oxyethyl)-4'-(2-hydroxyethyl)-bisphenol A (Isomer III), reference Formula 1 throughout.

In the second step, the reactor was then charged with 306 grams of fumaric acid (resin grade) from Bartek Ingredients Ink Company, 1.2 grams of butylstannoic acid obtained as FASCAT 4100 from Elf Atochem, and 220 milligrams of hydroquinone. The temperature was then raised to 190° C. over a 2 hour period, and the pressure was then reduced to 7.1 Torr over a 3 hour period, wherein water was collected in the distillation receiver. The resin, was then discharged through the bottom drain valve. The resin exhibited a glass transition temperature (onset) of 58° C. using the DuPont differential scanning calorimeter and obtained during the second heating cycle of the resin at a heating rate of 10° C. per minute. The melt index of this resin was found to be 38 grams per 10 minute using a 2.16 kilograms weight at a temperature of 117° C. The softening point of this resin using the Mettler softening point apparatus was found to be 108° C. The weight average molecular weight was found to be 13,400 grams/mole and the number average molecular weight was found to be 3,700 grams/mole with a polydispersity of 3.6 as measured by the gel permeation chromatography and using tetrahydrofuran as the solvent and polystyrene as the standard. The acid number of this resin was 12.3 milligrams of KOH per gram of sample.

Three hundred (300) grams of the unsaturated polyester obtained in Example II were weighed and dry-blended using a jar mill with 2.0 grams of Lucidol 75, a benzoyl peroxide with 25 percent water from Elf Atochem. The resulting blended mixture was extruded through an APV 15 millimeters twin screw extruder, which were set at 330° F. The extrudate strand from the extruder die was cooled in a water bath and the solid strands resulting were air-dried and then crushed into fine particles (95 percent by weight passing through 3.36 millimeters sieve) of less than about 3 millimeters in dimension. The melt index of the crosslinked product (A) was found to be 4.2 grams per 10 minutes using 16.6 kilograms weight at a temperature of 125° C. on a Tinius-Olsen Extrusion Plastometer. The gel content of the crosslinked product (A), defined as the percentage of toluene insoluble portion not passing through a 0.45 micron filter in a filtration procedure, was found to be 30.5 percent. The lower amount of Isomer I present, such as about 2.8 weight percent, a higher gel content of about 30.5 percent was obtained as compared to Comparative Example I, wherein only 7.5 percent gel was obtained due to the presence of a higher amount of about 4.8 percent of Isomer I, which is believed to inhibit the crosslinking of the resin with the peroxide.

EXAMPLE IV

An unsaturated polyester resin, poly(propoxylated bisphenol co-fumarate), derived from 1 mole equivalent of fumaric acid, 2.10 mole equivalent of propylene carbonate and 1 mole equivalent of bisphenol A was prepared, in a three-step process and using potassium carbonate and potassium t-butoxide as the catalysts in the first and second step, respectively.

In the first step, a 2 Hoppes Reactor equipped with a vacuum line, and distillation apparatus was charged with 600 grams of bisphenol A obtained from Shell, 599.6 grams of propylene carbonate obtained as Jeffsol PC from Huntsman Chemicals, and 1.2 grams of potassium carbonate. The mixture was heated to 190° C. over a 1 hour period with stirring and maintained at that temperature for an additional 4 hours. A sample of this mixture was analyzed by LC chromatography, wherein it was found to contain 2.7 percent by weight of 4-(2-hydroxyethyl)-bisphenol A (Isomer I), 97 percent by weight of bis 4,4'-(2-hydroxyethyl)-bisphenol A (Isomer II), and 0.3 percent by weight of 4-(2'-hydroxyethyl-2-oxyethyl)-4'-(2-hydroxyethyl)-bisphenol A (Isomer III). In the second step, 30 grams of propylene carbonate and 0.5 grams of potassium t-butoxide were added and the mixture was maintained at a temperature of 195° C. for a duration of 1 hour. A sample of this mixture was analyzed by LC chromatography, wherein it was found to contain 0.5 percent by weight of 4-(2-hydroxyethyl)-bisphenol A (Isomer I), 94 percent by weight of bis 4,4'-(2-hydroxyethyl)-bisphenol A (Isomer II), and 5.5 percent by weight of 4-(2'-hydroxyethyl-2-oxyethyl)-4'-(2-hydroxyethyl)-bisphenol A and higher ordered polyol (Isomer III).

In the third step, the reactor was then charged with 306 grams of fumaric acid (resin grade) from Bartek Ingredients Ink Company, 1.2 grams of butylstannoic acid obtained as FASCAT 4100 from Elf Atochem, and 220 milligrams of hydroquinone. The temperature was then raised to 190° C. over a 2 hour period, and the pressure was then reduced to 7.0 Torr over a 3 hour period, wherein water was collected in the distillation receiver. The resin was then discharged through the bottom drain valve. The resin exhibited a glass transition temperature (onset) of 57.0° C. using the DuPont differential scanning calorimeter and obtained during the second heating cycle of the resin at a heating rate of 10° C. per minute. The melt index of this resin was found to be 32 grams per 10 minute using a 2.16 kilograms weight at a temperature of 117° C. The softening point of this resin using the Mettler softening point apparatus was found to be 107° C. The weight average molecular weight was found to be 13,500 grams/mole and the number average molecular weight was found to be 3,500 grams/mole with a polydispersity of 3.85 as measured by the gel permeation chromatography and using tetrahydrofuran as the solvent and polystyrene as the standard. The acid number of this resin was 10.3 milligrams of KOH per gram of sample.

Three hundred (300) grams of the unsaturated polyester were weighed and dry-blended using a jar mill with 2.0 grams of Lucidol 75, a benzoyl peroxide with 25 percent water from Elf Altochem. The resulting blended mixture was extruded through an APV 15 millimeter twin screw extruder, which were set at 330° F. The extrudate strand from the extruder die was cooled in a water bath and the solid strands resulting were air-dried and then crushed into fine particles (95 percent by weight passing through 3.36 millimeters sieve) of less than about 3 millimeters in dimension. The melt index of the crosslinked product (A) was found to be 4.2 gram per 10 minutes using 16.6 kiligrams weight at a temperature of 125° C. on a Tinius-Olsen Extrusion Plastometer. The gel content of the crosslinked product (A), defined as the percentage of toluene insoluble portion not passing through a 0.45 micron filter in a filtration procedure, was found to be 44 percent. The lower amount of Isomer I present, such as about 0.5 weight percent, resulted in a higher gel content of about 44 percent was obtained as compared to Comparative Example I, wherein only 7.5 percent gel was obtained due to the presence of a higher amount of about 4.8 percent of Isomer I, or Example II wherein 30 gel was obtained due primarily to the presence of about 2.8 percent of Isomer I.

EXAMPLE V

An unsaturated polyester resin, poly(propoxylated bisphenol co-fumarate), derived from 1 mole equivalent of fumaric acid, 2.15 mole equivalent of propylene carbonate and 1 mole equivalent of bisphenol A was prepared, in a three-step process and using potassium carbonate and potassium t-butoxide as the condensation catalyst in the first and second step, respectively.

In the first step, a 2 Hoppes Reactor equipped with a vacuum line, and distillation apparatus was charged with 600 grams of bisphenol A obtained from Shell, 599.6 grams of propylene carbonate obtained as Jeffsol PC from Huntsman Chemicals, and 1.2 grams of potassium carbonate. The mixture was heated to 190° C. over a 1 hour period with stirring and maintained at that temperature for an additional 4 hours. A sample of this mixture was analyzed by LC chromatography, wherein it was found to contain 2.7 percent by weight of 4-(2-hydroxyethyl)-bisphenol A (Isomer I), 97 percent by weight of bis 4,4'-(2-hydroxyethyl)-bisphenol A (Isomer II), and 0.3 percent by weight of 4-(2'-hydroxyethyl-2-oxyethyl)-4'-(2-hydroxyethyl)-bisphenol A (Isomer III). In the second step, 45 grams of propylene carbonate and 0.5 grams of potassium t-butoxide were added and the mixture maintained at a temperature of 195° C. for a duration of 1 hour. A sample of this mixture was analyzed by LC chromatography, wherein it was found to contain 0.2 percent by weight of 4-(2-hydroxyethyl)-bisphenol A (Isomer I), 90 percent by weight of bis 4,4'-(2-hydroxyethyl)-bisphenol A (Isomer II), and 9.8 percent by weight of 4-(2'-hydroxyethyl-2-oxyethyl)-4'-(2-hydroxyethyl)-bisphenol A and higher ordered polyol (Isomer III).

In the third step, the reactor was then charged with 306 grams of fumaric acid (resin grade) from Bartek Ingredients Ink Company, 1.2 grams of butylstannoic acid obtained as FASCAT 4100 from Elf Atochem, and 220 milligrams of hydroquinone. The temperature was then raised to 190° C. over a 2 hour period, and the pressure was then reduced to 7.0 Torr over a 3 hour period, wherein water was collected in the distillation receiver. The resin, was then discharged through the bottom drain valve. The resin exhibited a glass transition temperature (onset) of 53° C. using the DuPont differential scanning calorimeter and obtained during the second heating cycle of the resin at a heating rate of 10° C. per minute. The melt index of this resin was found to be 35 grams per 10 minutes using a 2.16 kilograms weight at a temperature of 117° C. The softening point of this resin using the Mettler softening point apparatus was found to be 106° C. The weight average molecular weight was found to be 15,000 grams/mole and the number average molecular weight was found to be 4,000 grams/mole with a polydispersity of 3.75 as measured by the gel permeation chromatography and using tetrahydrofuran as the solvent and polystyrene as the standard. The acid number of this resin was found to be 11.3 milligrams of KOH per gram of sample.

COMPARATIVE EXAMPLE VI

An unsaturated polyester resin, poly(propoxylated bisphenol co-fumarate), derived from 1 mole equivalent of fumaric acid, 2.15 mole equivalent of propylene carbonate and 1 mole equivalent of bisphenol A was prepared, in a two-step process and using potassium carbonate and potassium t-butoxide as the condensation catalyst in the first step.

In the first step, a 2 Hoppes Reactor equipped with a vacuum line, and distillation apparatus was charged with 600 grams of Bisphenol A obtained from Shell, 644.6 grams of propylene carbonate obtained as Jeffsol PC from Huntsman Chemicals, 1.2 grams of potassium carbonate and 0.5 grams of potassium t-butoxide. The mixture was heated to 195° C. over a 1 hour period with stirring and maintained at that temperature for an additional 1 hour. A sample of this mixture was analyzed by LC chromatography, wherein it was found to contain 11 percent by weight of 4-(2-hydroxyethyl)-bisphenol A, 75 percent by weight of bis 4,4'-(2-hydroxyethyl)-bisphenol A, and 14 percent by weight of 4-(2'-hydroxyethyl-2-oxyethyl)-4'-(2-hydroxyethyl)-bisphenol A. Using both alkali carbonate and alkali alkoxide, a higher amount of Isomer I was obtained in comparison to that of Examples II, III, IV and V.

In the second step, the reactor was then charged with 306 grams of fumaric acid (resin grade) from Bartek Ingredients Ink Company, 1.2 grams of butylstannoic acid obtained as FASCAT 4100 from Elf Atochem, and 220 milligrams of hydroquinone. The temperature was then raised to 190° C. over a 2 hour period, and the pressure was then reduced to 7.0 Torr over a 3 hour period, wherein water was collected in the distillation receiver. The resin, was then discharged through the bottom drain valve. The resin exhibited a glass transition temperature (onset) of 52.° C. using the DuPont differential scanning calorimeter and obtained during the second heating cycle of the resin at a heating rate of 10° C. per minute. The melt index of this resin was found to be 35 grams per 10 minute using a 2.16 kilograms weight at a temperature of 117° C. The softening point of this resin using the Mettler softening point apparatus was found to be 107° C. The weight average molecular weight was found to be 15,200 grams/mole and the number average molecular weight was found to be 4,800 grams/mole with a polydispersity of 3.16 as measured by the gel permeation chromatography and using tetrahydrofuran as the solvent and polystyrene as the standard. The acid number of this resin was 6.5 milligrams of KOH per gram of sample.

Three hundred (300) grams of the unsaturated polyester obtained was dry-blended using a jar mill with 2.0 grams of Lucidol 75, a benzoyl peroxide with 25 percent water from Elf Atochem. The resulting blended mixture was extruded through an APV 15 millimeters twin screw extruder, which were set at 330° F. The extrudate strand from the extruder die was cooled in a water bath and the solid strands resulting were air dried and then crushed into fine particles (95 percent by weight passing through 3.36 millimeters sieve) of less than about 3 millimeters in dimension. The gel content of the crosslinked product (A), defined as the percentage of toluene insoluble portion not passing through a 0.45 micron filter in a filtration procedure, was found to be about 0 percent. This resin was not crosslinked utilizing Lucidol 75, due to the presence of about 11 percent of isomer I in the resin which is believed to inhibit the crosslinking reaction.

EXAMPLE VII

A toner comprised of a crosslinked unsaturated polyester resin prepared by a reactive extrusion process by melt mixing 94 parts of the unsaturated polyester of Example IV with Lucidol 75 peroxide initiator, and 6 percent by weight of carbon black was prepared as follows.

Three hundred (300) grams of the unsaturated polyester were weighed and dry-blended using a jar mill with 2.0 grams of Lucidol 75, a benzoyl peroxide with 25 percent water from Elf Atochem. The resulting blended mixture was extruded through an APV 15 millimeters twin screw extruder, which were set at 330° F. The extrudate strand from the extruder die was cooled in a water bath and the solid strands resulting were air dried and then crushed into fine particles (95 percent by weight passing through 3.36 millimeters sieve) of less than about 3 millimeters in dimension. The melt index of the crosslinked product (A) was found to be 4.2 grams per 10 minutes using 16.6 kilograms weight at a temperature of 125° C. on a Tinius-Olsen Extrusion Plastometer. The gel content of the crosslinked product (A), defined as the percentage of toluene insoluble portion not passing through a 0.45 micron filter in a filtration procedure was found to be 44.5 percent.

The above crosslinked polyester resin (261 grams), 15 grams of carbon black (REGAL® 330), 15 grams of polypropylene wax (Visco 660P by Sanyo Chemical) and 9 grams of compatibilizer (AX-8840, a polyethylene glycidylmethacrylate, obtained from ELF Atochem) were weighted and dry-blended using a tumbler for 45 minutes. The dry blend was then melt-mixed together on the APV extruder, which was set at 300° F. The extrudate strand was cooled down in a water bath, and then dried and crushed into fine particles (95 percent by weight passing through 3.36 millimeters sieve). The resulting crushed toner particles were then ground into fine toners using a jet mill (0202 Jet-O-Mizer), which toner was then classified using an A12 ACUCUT Classifier. The resulting toner product was comprised of 87 percent by weight crosslinked polyester, 5 percent by weight carbon black (REGAL®330), 5 percent by weight wax (660P) and 3 percent by weight compatibilizer (AX-8840). The volume median diameter of the toner product was 9.04 micron with 11.3 percent by number of fines between 1.26 to 4 microns. The toner tribo was found to be 5.18 microcoulombs/gram as measured on a semi-automatic Tribo Blow-Off Apparatus.

EXAMPLE VIII

A toner comprised of a crosslinked unsaturated polyester resin prepared by a reactive extrusion process by melt mixing 94 parts of the unsaturated polyester of Example V with Lucidol 75 peroxide initiator, and 6 percent by weight of carbon black was prepared as follows.

Three hundred (300) grams of the unsaturated polyester obtained in Example V were weighed and dry-blended using a jar mill with 1.5 grams of Lucidol 75, a benzoyl peroxide with 25 percent water from Elf Atochem. The resulting blended mixture was extruded through an APV 15 millimeters twin screw extruder, which were set at 330° F. The extrudate strand from the extruder die was cooled in a water bath and the solid strands resulting were air dried and then crushed into fine particles (95 percent by weight passing through 3.36 millimeters sieve) of less than about 3 millimeters in dimension. The melt index of the crosslinked product (A) was found to be 4 grams per 10 minutes using 16.6 kiligrams weight at a temperature of 125° C. on a Tinius-Olsen Extrusion Plastometer. The gel content of the crosslinked product (A), defined as the percentage of toluene insoluble portion not passing through a 0.45 micron filter in a filtration procedure, was found to be 45 percent. Due to the presence of low amounts of Isomer I in this resin, less amount of Lucidol 75 was utilized to crosslink the resin.

The above crosslinked polyester resin (261 grams), 15 grams of carbon black (Regal®330), 15 grams of polypropylene wax (Visco 660P by Sanyo Chemical) and 9 grams of (AX-8840 by ELF Atochem) were weighted and dry-blended using a tumbler for 45 minutes. The dry-blend was then melt-mixed together on the APV extruder, which was set at 300° F. The extrudate strand was cooled down in a water bath, and then dried and crushed into fine particles (95 percent by weight passing through 3.36 millimeters sieve. The resulting crushed toner particles were then ground into fine toners using a jet mill (0202 Jet-O-Mizer), which toner was then classified using an A12 ACUCUT Classifier. The resulting toner product comprised of 87 percent by weight crosslinked polyester, 5 percent by weight carbon black (REGAL®330), 5 percent by weight wax (660P) and 3 percent by weight compatibilizer (AX-8840). The volume median diameter of the toner product was 9.1 microns with 11 percent by number of fines between 1.2 to 4 microns. The toner tribo was found to be 5.3 microcoulomb/gram as measured on a semi-automatic Tribo Blow-Off Apparatus.

COMPARATIVE EXAMPLE IX

There was prepared a copolyester resin obtained from bisphenol A, propylene carbonate, ethylene glycol and terephthalic acid with sodium carbonate as the catalyst as disclosed by the Example I of Japanese 10095840 A2.

A 1 liter Parr reactor equipped with a mechanical stirrer was charged with 103.8 grams of bisphenol A, 102 grams of propylene carbonate and 0.1 grams of sodium carbonate. The reactor was purged with nitrogen and heated to an internal temperature of 180° C. The nitrogen purge was then stopped, and the reaction mixture was stirred for 1 hour, after which the temperature of the reactor was increased to 220° C. and stirred for an additional 1.5 hours. A sample of this mixture was analyzed by LC chromatography, wherein it was found to contain 2.3 percent by weight of 4-(2-hydroxyethyl)-bisphenol A (Isomer I), 96.9 percent by weight of bis 4,4'-(2-hydroxyethyl)-bisphenol A (Isomer II), and 0.76 percent by weight of 4-(2'-hydroxyethyl-2-oxyethyl)-4'-(2-hydroxyethyl)-bisphenol A (Isomer III).

To this were added 166 grams of terephthalic acid, 74 grams of ethylene glycol and 0.38 grams of toluene sulfonic acid. The reactor was then heated to a temperature of about 240° C. over a 5 hour period, during which time the pressure was reduced from atmospheric pressure, 760 to about 7 Torr, and water is collected in the distillation receiver. The reactor was then pressurized to atmospheric pressure (about 760 Torr), and the resin was discharged through the bottom drain valve into a container and allowed to cool to ambient temperature (about 25° C.) overnight (about 16 hours). The copolyester product, exhibited a glass transition temperature (onset) of 65° C. using the DuPont differential scanning calorimeter and obtained during the second heating cycle of the resin at a heating rate of 10° C. per minute.

In this Comparative Example, only one class of catalyst, alkali carbonate, was employed resulting in an isomeric mixture wherein about 2.4 percent by weight of isomer I was obtained, and inferior to the isomeric mixtures obtained in the present invention, such as Examples IV and V, wherein less than about 0.5 percent by weight of isomer I was obtained. Furthermore, to obtain crosslinked polyesters of high gel content such as about 45 percent by weight, it is necessary that less than about 1 weight percent of isomer I utilized as exemplified in Examples IV and V. Furthermore, the aforementioned '336 patent utilizes both a diol such as ethylene glycol, and a diacid such as terephthalic acid during the polymerization steps to form a copolyester. This differs from the present invention wherein in embodiments only a diacid such as fumaric acid is utilized to form the polyester during the polycondensation step.

Other embodiments and modifications of the present invention may occur to those of ordinary skill in the art subsequent to a review of the present application and the information presented herein; these embodiments modifications, and equivalents, or substantial equivalents thereof, are also included within the scope of the present invention.

What is claimed is:

1. A process for the preparation of an unsaturated polyester which comprises (i) reacting an organic diol with a cyclic alkylene carbonate in the presence of a first catalyst of an alkali carbonate to thereby form a polyalkoxy diol, and (ii) adding thereto a further amount of cyclic alkylene carbonate in the presence of a second catalyst of an alkali alkoxide, and (iii) subsequently polycondensing the resulting mixture with a dicarboxylic acid.

2. A process in accordance with claim 1 wherein the preparation of said unsaturated polyester comprises (i) reacting an organic diol in an amount of from about 0.95 to about 1.05 mole equivalents with a cyclic akylene carbonate in an amount of from about 1.95 to about 2.05 mole equivalents, in the presence of said first alkali carbonate catalyst in an amount of from about 0.001 to about 0.1 mole equivalents, to thereby form a polyalkoxy diol, and wherein the polyalkoxy diol is comprised of isomers with from about 2 to about 5 weight percent of isomer I, from about 95 to about 99 weight percent of isomer II, and from about 0 to about 3 weight percent of isomer III, and the sum of I, II, and III is about 100 percent and wherein said isomers are of the following formulas

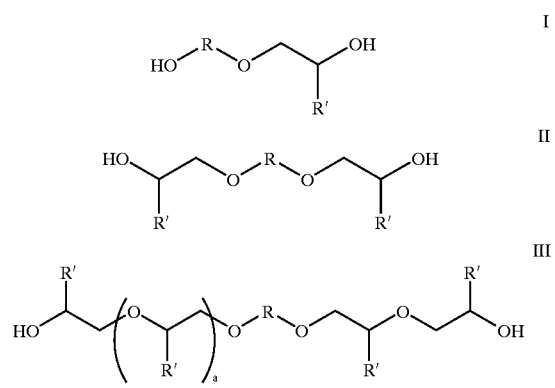

and followed by subsequently polycondensing the resulting polyalkoxy diol with said dicarboxylic acid in an amount of from about 0.95 to about 1.05 mole equivalents, wherein R is an aromatic component, R' is hydrogen or alkyl, and a is zero, 1, or 2, or a mixture of zero, 1, and 2.

3. A process in accordance with claim 1 wherein the preparation of the unsaturated polyester comprises (i) reacting an organic diol in an amount of from about 0.95 to about 1.05 mole equivalents with a cyclic akylene carbonate in an amount of from about 1.95 to about 2.05 mole equivalents, in the presence of said first alkali carbonate catalyst in an amount of from about 0.001 to about 0.1 mole equivalents; adding thereto (ii) from about 0.05 to about 0.45 mole equivalents of cyclic alkylene carbonate in the presence of said second alkali alkoxide catalyst in an amount of from about 0.001 to about 0.1 mole equivalents, to thereby form a polyalkoxy diol comprised of isomers with from about 0 to about 1 weight percent of isomer I, from about 85 to about 97 weight percent of isomer II, and from about 3 to about 15 weight percent of isomer III, and the sum of I, II, and III is about 100 percent and wherein said isomers are of the formulas

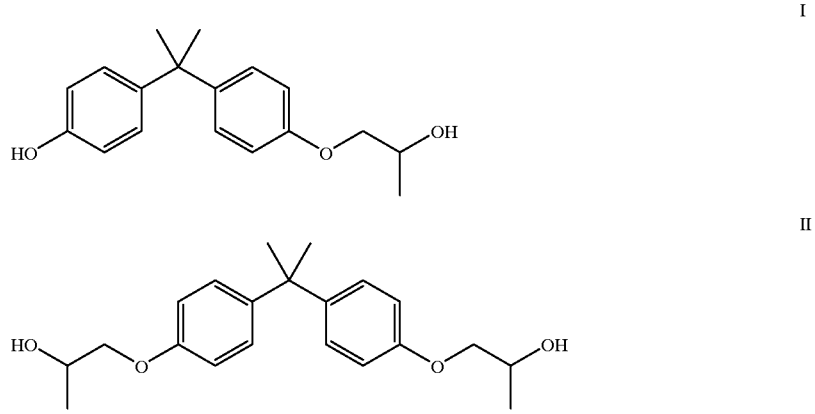

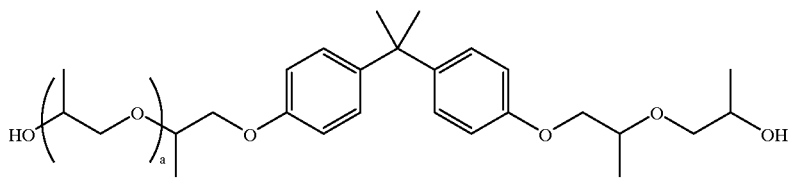

III and followed by subsequently polycondensing the resulting polyalkoxy diol with a dicarboxylic acid in an amount of from about 0.95 to about 1.05 mole equivalent, wherein a is zero, 1, 2, or a mixture of zero, 1 and 2.

4. A process in accordance with claim 1 wherein there is formed a crosslinked polyester generated by the reactive extrusion of a peroxide and said unsaturated polyester.

5. A process in accordance with claim 1 wherein said first catalyst is sodium carbonate.

6. A process in accordance with claim 1 wherein said second catalyst is lithium butoxide.

7. A process in accordance with claim 1 wherein said reacting is accomplished in the presence of heat.

8. A process in accordance with claim 1 wherein said reacting is accomplished by heating at a temperature of from about 160° C. to about 215° C.

9. A process in accordance with claim 1 wherein said reacting is accomplished by heating at a temperature of from about 180° C. to about 200° C.

10. A process in accordance with claim 1 wherein said polycondensing is accomplished by heating.

11. A process in accordance with claim 1 wherein said polycondensing is accomplished by heating at a temperature of from about 185° C. to about 225° C.

12. A process in accordance with claim 1 wherein said polycondensing is accomplished by heating at a temperature of from about 185° C. to about 225° C. for a duration of from about 1 to about 5 hours, followed by reducing the pressure from about 760 Torr to about 1 Torr over a period of from about 1 to about 6 hours.

13. A process in accordance with claim 1 wherein subsequent to said polycondensing the reaction mixture is cooled.

14. A process in accordance with claim 13 wherein said cooling is from about 25° C. to about 40° C.

15. A process in accordance with claim 13 wherein said cooling is to about 25° C.

16. A process in accordance with claim 1 wherein there is formed a crosslinked polyester generated by the reactive extrusion of a peroxide and said unsaturated polyester.

17. A process in accordance with claim 16 wherein said crosslinking is represented by a gel content of from about 3 to about 75 percent.

18. A process in accordance with claim 16 wherein said crosslinking is represented by a gel content of from about 3 to about 45 percent.

19. A process in accordance with claim 1 wherein there is formed an unsaturated polyester resin of poly(propoxylated bisphenol co-fumarate), poly(ethoxylated bisphenol co-fumarate), poly(butyloxylated bisphenol co-fumarate), poly(co-propoxylated bisphenol co ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co ethoxylated bisphenol co-itaconate), or poly(1,2-propylene itaconate).

20. A process in accordance with claim 1 wherein said diol is 1,2-propanediol, 1,3-propanediol, 1,3- butane diol, pentylene glycol, hexylene glycol, diphenol, neopentyl glycol, diethylene glycol, dipropylene glycol, 2,2-bis-(4-hydroxy phenyl) propane, 2,2-bis-(3-hydroxy phenyl) propane, 2,2-bis-(2-hydroxy phenyl) propane, 2,2-bis-(3-hydroxy phenyl) propane, 2,2-bis-(5-hydroxy phenyl) propane, bisphenol A, ethoxylated bisphenol A, bis-(4-hydroxy phenyl) methane, 1,1-bis-(4-hydroxy phenyl) ethane, cis-1,4-dihydroxy-cyclohexane, trans-1,4-dihydroxy-cyclohexane, cis-1,2-dihydroxy-cyclohexane, trans-1,2-dihydroxy-cyclohexane, trans-1,3-dihydroxy-cyclohexane, cis-1,3-dihydroxy-cyclohexane, and mixtures thereof and which diol is optionally selected in an amount of from about 0.90 mole equivalents to about 1.1 mole equivalents, based on about 1 mole equivalent of dicarboxylic acid utilized.

21. A process in accordance with claim 1 wherein said diol is 2,2-bis-(4-hydroxy phenyl) propane or bisphenol A.

22. A process in accordance with claim 1 wherein the dicarboxylic acid is fumaric acid, malonic acid, itaconic acid, 2-methylitaconic acid, maleic acid, maleic anhydride, adipic acid, succinic acid, suberic acid, 2-ethyl succinic acid, glutaric acid, dodecylsuccinic acid, 2-methyladipic acid, pimelic acid, azeilic acid, sebacic acid, terephthalic acid, isophthalic acid, phthalic acid, 1,2-cyclohexanedioic acid, 1,3-cyclohexanedioic acid, 1,4-cyclohexanedioic acid, dialkyl esters wherein alkyl contains from about 2 to about 22 carbon atoms, and are esters of malonate, succinate, fumarate, itaconate, terephthalate, isophthalate, phthalate, cyclohexanedioate, mixtures thereof, and which diacids are optionally selected in an amount of from about 0.95 mole equivalent to about 1.1 mole equivalents, based on about 1 mole equivalent of organic diol utilized.

23. A process in accordance with claim 1 wherein the dicarboxylic acid is fumaric acid.

24. A process in accordance with claim 1 wherein the cyclic alkylene carbonate is ethylene carbonate, propylene carbonate, butylene carbonate, or mixtures thereof, and which alkylene carbonate is selected in an amount of from about 1.90 mole equivalents to about 2.45 mole equivalents, based on about 1 mole equivalent of organic diol utilized.

25. A process in accordance with claim 1 wherein said first alkali catalyst is sodium carbonate.

26. A process in accordance with claim 1 wherein the alkali carbonate is potassium carbonate, sodium carbonate, rubidium carbonate, cesium carbonate, beryllium carbonate, magnesium carbonate, calcium carbonate, strontium carbonate, manganese carbonate, or barium carbonate and mixtures thereof and which alkali carbonate is selected in an amount of from about 0.001 mole equivalent to about 0.01 mole, based on about 1 mole equivalent of organic diol utilized.

27. A process in accordance with claim 1 wherein the alkali carbonate is potassium carbonate.

28. A process in accordance with claim 27 wherein the second catalyst is an alkali alkoxide.

29. A process in accordance with claim 1 wherein the alkyl alkoxide is lithium methoxide, lithium ethoxide, lithium propoxide, lithium butoxide, lithium isopropoxide, lithium isobutoxide, lithium t-butoxide, potassium methoxide potassium ethoxide, potassium propoxide, potassium butoxide, potassium isopropoxide, potassium isobutoxide, potassium t-butoxide, sodium methoxide, sodium ethoxide, sodium propoxide, sodium butoxide, sodium isopropoxide, sodium isobutoxide, sodium t-butoxide, or mixtures thereof, and which alkali alkoxide is selected in an amount of from about 0.001 mole equivalent to about 0.05 mole equivalent, based on about 1 mole equivalent of organic diol utilized.

30. A process in accordance with claim 1 wherein the alkyl alkoxide is potassium t-butoxide.

31. A process in accordance with claim 1 wherein said first catalyst is selected in an amount of from about 0.01 to about 0.1 mole percent by weight of the unsaturated polyester.

32. A process in accordance with claim 1 wherein said second catalyst is selected in an amount of from about 0.01 to about 0.1 mole percent by weight of the unsaturated polyester.

33. A process in accordance with claim 4 wherein the peroxide is an aliphatic peroxide, an aromatic peroxide, or mixtures thereof.

34. A process in accordance with claim 33 wherein the peroxide is benzoyl peroxide, lauryl peroxide, t-butyl peroxide, propyl peroxide, or stearyl peroxide.

35. A process in accordance with claim 2 wherein a polyester resin is formed by (i) reacting an organic diol in an amount of from about 0.95 to about 1.05 mole equivalents, with a cyclic akylene carbonate in an amount of from about 1.95 to about 2.05 mole equivalents, and a catalyst in an amount of from about 0.001 to about 0.1 mole equivalents at a temperature of from about 175° C. to about 205° C., for a duration of from about 1 to about 6 hours; and followed by polycondensing with a dicarboxylic acid in an amount of from about 0.95 to about 1.05 mole equivalents.

36. A process in accordance with claim 1 wherein said polyester resin is formed by (i) reacting an organic diol in an amount of from about 0.95 to about 1.05 mole equivalent, with a cyclic akylene carbonate in an amount of from about 1.95 to about 2.05 mole equivalents, and a catalyst in an amount of from about 0.001 to about 0.1 mole equivalent, at a temperature of from about 175° C. to about 205° C.; (ii) adding thereto a cyclic akylene carbonate in an amount of from about 0.05 to about 0.35 mole equivalent, with a second alkali alkoxide catalyst in an amount of from about 0.001 to about 0.1 mole equivalent, at a temperature of from about 185° C. to about 205° C.; and (iii) followed by polycondensing with a dicarboxylic acid in an amount of from about 0.95 to about 1.05 mole equivalent.

37. A process in accordance with claim 1 wherein the unsaturated polyester resin is obtained from (i) condensing about 0.95 to about 1.05 mole equivalent of an organic diol, with from about 1.95 to about 2.05 mole equivalent of an alkylene carbonate in the presence of a first alkali catalyst at a temperature of from about 175° C. to about 205° C.; and (ii) optionally adding thereto a further amount of from about 0.05 to about 0.35 mole equivalent of said cyclic alkylene carbonate and a second catalyst a temperature of from about 185° C. to about 205° C., for a duration of from about 1 to about 3 hours; and (iii) polycondensing with a dicarboxylic acid in an amount of from about 0.95 to about 1.05 mole equivalent, for a duration of from about 1 to 3 hours, and followed by reducing the pressure from about 760 Torr to about 1 Torr.

38. A process in accordance with claim 1 wherein said cyclic alkylene carbonate is employed in an amount of from about 1.9 equivalents to about 2.1 mole equivalents, based on about 1 mole equivalent of organic diol utilized.

39. A process in accordance with claim 1 wherein there is further added a cyclic alkylene carbonate in an amount of from about 0.05 mole equivalent to about 0.30 mole equivalent, based on about 1 mole equivalent of organic diol utilized.

40. A process in accordance with claim 1 wherein the unsaturated polyester resin is obtained from (i) condensing about 0.95 to about 1.05 mole equivalent of an organic diol, with from about 1.95 to about 2.05 mole equivalent of an alkylene carbonate in the presence of a first alkali catalyst at a temperature of from about 175° C. to about 205° C., for a duration of from about 1 to about 6 hours; and (ii) optionally adding thereto a further amount of from about 0.05 to about 0.35 mole equivalent of a cyclic alkylene carbonate and said second catalyst a temperature of from about 185° C. to about 205° C., for a duration of from about 1 to about 3 hours; and (iii) followed by a third step comprised of adding a dicarboxylic acid, heating the mixture of from about 185° C. to about 220° C., followed by reducing the pressure from about 760 Torr to about 1 Torr.

41. A process in accordance with claim 1 wherein the polyester resulting is poly(propoxylated bisphenol co-fumarate), poly(ethoxylated bisphenol co-fumarate), poly(butyloxylated bisphenol co-fumarate), poly(co-propoxylated bisphenol co ethoxylated bisphenol co-fumarate), or poly(propoxylated bisphenol co-maleate).

42. A process for the preparation of crosslinked polyesters obtained from the reactive extrusion of a peroxide and an unsaturated polyester resin, and which resin is generated by (i) reacting an organic diol with a cyclic alkylene carbonate in the presence of a first catalyst to thereby form a polyalkoxy diol; (ii) adding thereto a further amount of cyclic alkylene carbonate in the presence of a second catalyst; and (iii) subsequently polycondensing the resulting mixture with a dicarboxylic acid, and wherein said first catalyst is an alkali carbonate, and wherein said second catalyst is an alkali alkoxide.

43. A process in accordance with claim 1 wherein the polyester is poly(propoxylated bisphenol), and the bisalkoxy diol is propoxylated bisphenol A comprised of mixture of isomers of 4-(2-hydroxyethyl)-bisphenol A, bis 4,4'-(2-hydroxyethyl)-bisphenol A, 4-(2'-hydroxyethyl-2-oxyethyl)-4'-(2-hydroxyethyl)-bisphenol A and/or higher ordered propoxylated bisphenol A polyols, illustrated as monomers I, II and III, respectively, of Formula 2

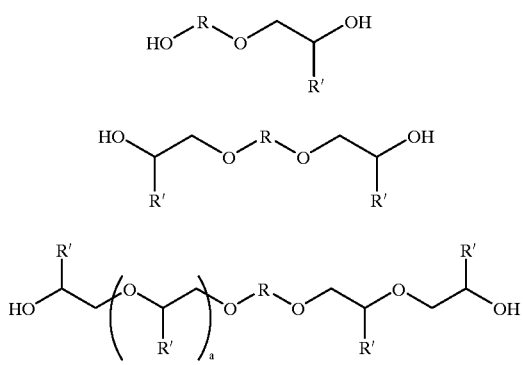

wherein R is an aromatic component, R' is hydrogen or alkyl, and a is zero, 1, or 2, or a mixture of zero, 1, and 2.

44. A process in accordance with claim 1 wherein the polyester is poly(propoxylated bisphenol), and the diol is a bis-alkoxy diol of propoxylated bisphenol A comprised of mixture of isomers of 4-(2-hydroxyethyl)-bisphenol A, bis 4,4'-(2-hydroxyethyl)-bisphenol A, 4-(2'-hydroxyethyl-2-oxyethyl)-4'-(2-hydroxyethyl)-bisphenol A and/or higher ordered propoxylated bisphenol A polyols, illustrated as monomers I, II and III, respectively, of Formula 1 wherein a is zero, 1, 2, or a mixture of zero, 1 and 2.

45. A process in accordance with claim 43 wherein the isomers contain from about 2 to about 5 weight percent of isomer I, from about 90 to about 97 weight percent of isomer II, and from about 0 to about 3 weight percent of isomer III, and the sum of I, II, and III is about 100 percent.

46. A process in accordance with claim 1 wherein the preparation of an unsaturated polyester is comprised of (i) reacting bisphenol A or 2,2-bis(4-hydroxy phenyl) propane with a propylene carbonate in the presence of a first catalyst to thereby form a bis-alkoxy diol, and (ii) adding thereto said further amount of propylene carbonate in the presence of a second catalyst, and wherein the bis-alkoxy diol is comprised of the isomers of Formula 1

I

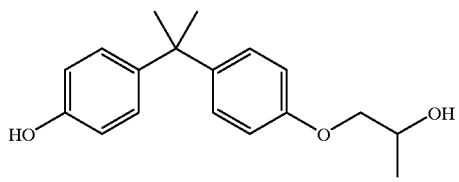

II

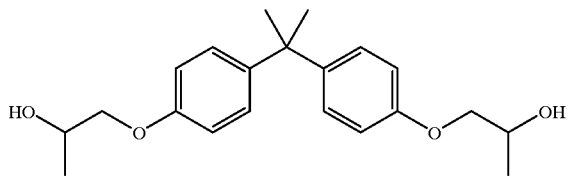

III

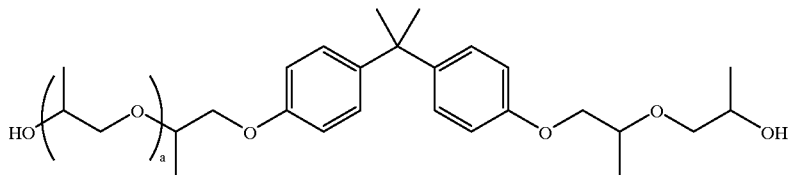

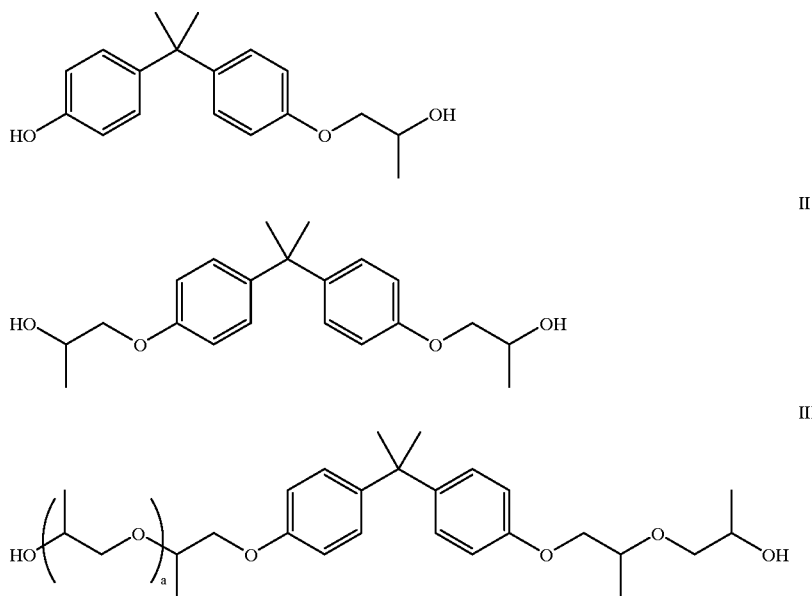

I

II

III with from about 0 to about 1 weight percent of isomer I, from about 85 to about 97 weight percent of isomer II, and from about 3 to about 15 weight percent of isomer III, and the sum of I, II, and III is about 100 percent, and wherein a is zero, 1, 2, or 2.

47. A process in accordance with claim 2 wherein the aromatic R component is a radical moiety selected from the group consisting of selected from 2,2-bis-(4-hydroxy phenyl) propane, 2,2-bis-(3-hydroxy phenyl) propane, 2,2-bis-(2-hydroxy phenyl) propane, 2,2-bis-(3-hydroxy phenyl) propane, 2,2-bis-(5-hydroxy phenyl) propane, bisphenol A, ethoxylated bisphenol A, bis-(4-hydroxy phenyl) methane, 1,1 -bis-(4-hydroxy phenyl) ethane and hydroquinone.

48. A process in accordance with claim 3 wherein the aromatic R component is a radical moiety of 2,2-bis-(4-hydroxy phenyl) propane, 2,2-bis-(3-hydroxy phenyl) propane, 2,2-bis-(2-hydroxy phenyl) propane, 2,2-bis-(3-hydroxy phenyl) propane, 2,2-bis-(5-hydroxy phenyl) propane, bisphenol A, ethoxylated bisphenol A, bis-(4-hydroxy phenyl) methane, 1,1-bis-(4-hydroxy phenyl) ethane or hydroquinone.

49. A process for the preparation of an unsaturated polyester which consists essentially of (i) reacting an organic diol with a cyclic alkylene carbonate in the presence of a first catalyst to thereby form a polyalkoxy diol, and (ii) adding thereto a further amount of said cyclic alkylene carbonate in the presence of a second catalyst, and (iii) subsequently polycondensing the resulting mixture with a dicarboxylic acid.

50. A process for the preparation of an unsaturated polyester which comprises reacting an organic diol in an amount of from about 0.95 to about 1.05 mole equivalents with a cyclic alkylene carbonate in an amount of from about 1.95 to about 2.05 mole equivalents, in the presence of a first alkali carbonate catalyst in an amount of from about 0.001 to about 0.1 mole equivalents, to thereby form a polyalkoxy diol, and wherein the polyalkoxy diol is comprised of isomers with from about 2 to about 5 weight percent of isomer I, from about 95 to about 99 weight percent of isomer II, and from about 0 to about 3 weight percent of isomer III, and the sum of I, II, and III is about 100 percent and wherein said isomers are of the following formulas

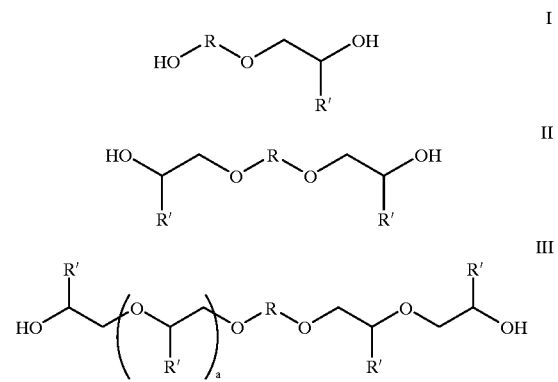

I

II

III and followed by subsequently polycondensing the resulting polyalkoxy diol with said dicarboxylic acid in an amount of from about 0.95 to about 1.05 mole equivalents, wherein R is an aromatic component, R' is hydrogen or alkyl, and a is zero, 1, or 2, or a mixture of zero, 1, and 2, and wherein the reaction with the cyclic alkylene carbonate is accomplished in the presence of an alkali alkoxide catalyst.

51. A process in accordance with claim 49 wherein there is formed a crosslinked polyester generated by the reactive extrusion of a peroxide and said unsaturated polyester.

52. A process in accordance with claim 49 wherein said first catalyst is potassium carbonate, and said second catalyst is potassium tertiary butoxide.

\* \* \* \* \*